US012340758B2

(12) United States Patent
Yang et al.

(10) Patent No.: US 12,340,758 B2
(45) Date of Patent: Jun. 24, 2025

(54) SOURCE DRIVER AND DRIVING METHOD THEREFOR, SOURCE DRIVING CIRCUIT AND DRIVING METHOD THEREFOR, AND DISPLAY APPARATUSES

(71) Applicant: BOE TECHNOLOGY GROUP CO., LTD., Beijing (CN)

(72) Inventors: Fei Yang, Beijing (CN); Yi Chen, Beijing (CN); Tianji Li, Beijing (CN); Mingi Chu, Beijing (CN); Zhiqiang Dong, Beijing (CN); Lirong Wang, Beijing (CN); Jingbo Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/927,627

(22) PCT Filed: Dec. 28, 2021

(86) PCT No.: PCT/CN2021/142216
§ 371 (c)(1),
(2) Date: Nov. 23, 2022

(87) PCT Pub. No.: WO2023/122997
PCT Pub. Date: Jul. 6, 2023

(65) Prior Publication Data
US 2024/0233652 A1 Jul. 11, 2024

(51) Int. Cl.
*G09G 3/3275* (2016.01)
*G09G 3/3233* (2016.01)

(52) U.S. Cl.
CPC ......... *G09G 3/3275* (2013.01); *G09G 3/3233* (2013.01); *G09G 2300/0842* (2013.01);
(Continued)

(58) Field of Classification Search
CPC ........................ G09G 3/3275; G09G 2310/027
See application file for complete search history.

(56) References Cited

U.S. PATENT DOCUMENTS 9,111,509 B2 * 8/2015 Kim ..................... G09G 3/3688
2006/0044296 A1 * 3/2006 Murade ................ G09G 3/3688
345/204
(Continued)

FOREIGN PATENT DOCUMENTS

CN 1828715 A 9/2006
CN 102402957 A 4/2012
(Continued)

*Primary Examiner* — William Boddie
*Assistant Examiner* — Bipin Gyawali
(74) *Attorney, Agent, or Firm* — Dority & Manning, P.A.

(57) ABSTRACT

A source driving circuit includes a first source driver and a second source driver. The first source driver is configured to convert latched first image data into a plurality of first data voltages in response to a first triggering moment of a first data transmission control signal, and output the plurality of first data voltages based on a second triggering moment of the first data transmission control signal. The second source driver is configured to convert latched second image data into a plurality of second data voltages in response to a first triggering moment of a second data transmission control signal, and output the plurality of second data voltages based on a second triggering moment of the second data transmission control signal. The second triggering moment of the first data transmission control signal and the second triggering moment of the second data transmission control signal have a time difference.

13 Claims, 11 Drawing Sheets

(52) U.S. Cl.
CPC ................. *G09G 2310/027* (2013.01); *G09G 2310/0291* (2013.01); *G09G 2310/06* (2013.01); *G09G 2320/0233* (2013.01); *G09G 2320/0242* (2013.01); *G09G 2370/08* (2013.01)

(56) References Cited

U.S. PATENT DOCUMENTS

2006/0193002 A1* 8/2006 Satou .................... G09G 3/3688 358/1.15
2008/0266219 A1 10/2008 Kim et al.
2009/0303169 A1* 12/2009 Tanikame ............ G09G 3/3208 345/100
2010/0302214 A1* 12/2010 Kim ..................... H04N 13/398 345/204
2012/0154343 A1* 6/2012 Yu ........................ G09G 3/3674 345/204
2013/0038585 A1 2/2013 Kasai
2013/0257842 A1 10/2013 Igawa
2021/0201838 A1 7/2021 Wei et al.
2021/0343242 A1* 11/2021 Wang ................... G09G 3/3258
2022/0157925 A1* 5/2022 Shin ..................... H10K 59/131
2022/0351665 A1* 11/2022 Liu .......................... G09G 3/20
2023/0142762 A1* 5/2023 Nakagawa ............ G01S 7/4863 356/5.01
2024/0393578 A1* 11/2024 Luo ...................... G02B 6/0051

FOREIGN PATENT DOCUMENTS

CN 102568430 A 7/2012
CN 105957493 A 9/2016
CN 108010489 A 5/2018
CN 108923861 A 11/2018

* cited by examiner

SOURCE DRIVER AND DRIVING METHOD THEREFOR, SOURCE DRIVING CIRCUIT AND DRIVING METHOD THEREFOR, AND DISPLAY APPARATUSES

CROSS-REFERENCE TO RELATED APPLICATION

This application is a national phase entry under 35 USC 371 of International Patent Application No. PCT/CN2021/142216, filed on Dec. 28, 2021, which is incorporated herein by reference in its entirety.

TECHNICAL FIELD

The present disclosure relates to the field of display technologies, and in particular, to a source driver and a driving method therefor, a source driving circuit and a driving method therefor, and display apparatuses.

BACKGROUND

There are a variety of types of display apparatuses. According to display media and operation principles, the display apparatuses may be classified into liquid crystal display (LCD) apparatuses, inorganic electroluminescent display (ELD) apparatuses, organic light-emitting diode (OLED) display apparatuses, and other types. Each type of display apparatuses may be applied to various scenarios, so as to meet different image display requirements.

With the advancement of display technologies and the gradual increase in application requirements, ultra-large size and ultra-high resolution have become the development direction of display apparatuses in the future.

SUMMARY

In an aspect, a source driving circuit is provided. The source driving circuit includes a first source driver and a second source driver. The first source driver is configured to convert latched first image data into a plurality of first data voltages in response to a first triggering moment of a first data transmission control signal, and output the plurality of first data voltages based on a second triggering moment of the first data transmission control signal. The second source driver is configured to convert latched second image data into a plurality of second data voltages in response to a first triggering moment of a second data transmission control signal, and output the plurality of second data voltages based on a second triggering moment of the second data transmission control signal. The second triggering moment of the first data transmission control signal and the second triggering moment of the second data transmission control signal have a time difference therebetween.

In some embodiments, the first triggering moment of the first data transmission control signal arrives at a same time as the first triggering moment of the second data transmission control signal.

In some embodiments, a waveform of the first data transmission control signal is the same as a waveform of the second data transmission control signal, and the first data transmission control signal and the second data transmission control signal have a phase difference therebetween.

In some embodiments, the first source driver includes an output buffer, the output buffer includes a plurality of output channels. The output buffer is configured to output the plurality of first data voltages respectively through the plurality of output channels based on the second triggering moment of the first data transmission control signal. Output moments of at least two output channels have a time difference therebetween.

In some embodiments, the first source driver further includes a delay controller, the delay controller is configured to output a plurality of output enable signals based on the first data transmission control signal. The output buffer is configured to output the plurality of first data voltages respectively through the plurality of output channels in response to the plurality of output enable signals.

In some embodiments, waveforms of the plurality of output enable signals are all the same, and at least two output enable signals have a phase difference therebetween. A first triggering moment of at least one output enable signal arrives at a same time as the first triggering moment of the first data transmission control signal; or the first triggering moment of the at least one output enable signal arrives at a same time as the second triggering moment of the first data transmission control signal.

In some embodiments, first triggering moments of the plurality of output enable signals arrive at a same time as the first triggering moment of the first data transmission control signal. An arrival moment of a second triggering moment of at least one output enable signal is later than an arrival moment of the second triggering moment of the first data transmission control signal.

In some embodiments, in a direction in which the plurality of output channels are arranged, output moments of any two adjacent output channels have a same time difference therebetween.

In another aspect, a source driver is provided. The source driver includes a data buffer, a digital-to-analog converter and an output buffer. The data buffer is configured to receive and latch image data, and output the image data in response to a first triggering moment of a data transmission control signal. The digital-to-analog converter is configured to receive the image data output by the data buffer and convert the image data into a plurality of data voltages. The output buffer includes a plurality of output channels, and the output buffer is configured to output the plurality of data voltages respectively through the plurality of output channels based on a second triggering moment of the data transmission control signal. Output moments of at least two output channels have a time difference therebetween.

In some embodiments, the source driver further includes a delay controller, and the delay controller is configured to output a plurality of output enable signals based on the data transmission control signal. The output buffer is configured to output the plurality of data voltages respectively through the plurality of output channels in response to the plurality of output enable signals.

In some embodiments, waveforms of the plurality of output enable signals are all the same, and at least two output enable signals have a phase difference therebetween. A first triggering moment of at least one output enable signal arrives at a same time as the first triggering moment of the data transmission control signal; or the first triggering moment of the at least one output enable signal arrives at a same time as the second triggering moment of the data transmission control signal.

In some embodiments, first triggering moments of the plurality of output enable signals arrive at a same time as the first triggering moment of the data transmission control signal, and an arrival moment of a second triggering moment of at least one output enable signal is later than an arrival moment of the second triggering moment of the data transmission control signal.

In some embodiments, in a direction in which the plurality of output channels are arranged, output moments of any two adjacent output channels have a same time difference therebetween.

In yet another aspect, a display apparatus is provided. The display apparatus includes the source driving circuit according to any of the above embodiments, a plurality of gate lines, a plurality of data lines, and at least one gate driver. The at least one gate driver is configured to generate a plurality of gate driving signals and output the plurality of gate driving signals respectively to the plurality of gate lines. The source driving circuit is configured to output both the plurality of first data voltages and the plurality of second data voltages respectively to the plurality of data lines.

In some embodiments, the display apparatus further includes a timing controller. The timing controller is configured to provide the first data transmission control signal and the second data transmission control signal to the source driving circuit.

In some embodiments, the plurality of gate lines have an equal line resistance.

In some embodiments, in a direction in which the plurality of data lines are arranged, the at least one gate driver is located on a same side of the plurality of data lines, and moments at which the plurality of data lines respectively receive both the plurality of first data voltages and the plurality of second data voltages are delayed step by step.

In some embodiments, the at least one gate driver includes a plurality of gate drivers. In a direction in which the plurality of data lines are arranged, the plurality of gate drivers include a first gate driver located on a side of the display apparatus, and a second gate driver located on another side of the display apparatus. The first gate driver and the second gate driver are coupled to a same gate line. In the direction in which the plurality of data lines are arranged, moments at which the plurality of data lines respectively receive both the plurality of first data voltages and the plurality of second data voltages are symmetrically delayed step by step from two sides of the display apparatus to a middle thereof.

In yet another aspect, a display apparatus is provided. The display apparatus includes the source driver according to any of the above embodiments, a plurality of gate lines, a plurality of data lines, and at least one gate driver. The at least one gate driver is configured to generate a plurality of gate driving signals and output the plurality of gate driving signals respectively to the plurality of gate lines. The source driver is configured to output the plurality of data voltages respectively to the plurality of data lines.

In yet another aspect, a driving method for a source driving circuit is provided, and the driving method is used for driving the source driving circuit according to any of the above embodiments. The driving method includes: the first source driver converting the latched first image data into the plurality of first data voltages in response to the first triggering moment of the first data transmission control signal, and outputting the plurality of first data voltages based on the second triggering moment of the first data transmission control signal; and the second source driver converting the latched second image data into the plurality of second data voltages in response to the first triggering moment of the second data transmission control signal, and outputting the plurality of second data voltages based on the second triggering moment of the second data transmission control signal. The second triggering moment of the first data transmission control signal and the second triggering moment of the second data transmission control signal have a time difference therebetween.

In yet another aspect, a driving method for a source driver is provided, and the driving method is used for driving the source driver according to any of the above embodiments. The driving method includes: receiving and latching the image data, and outputting the image data in response to the first triggering moment of the data transmission control signal; converting the image data into the plurality of data voltages; and outputting the plurality of data voltages based on the second triggering moment of the data transmission control signal. The output moments of at least two data voltages have a time difference between.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these accompanying drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
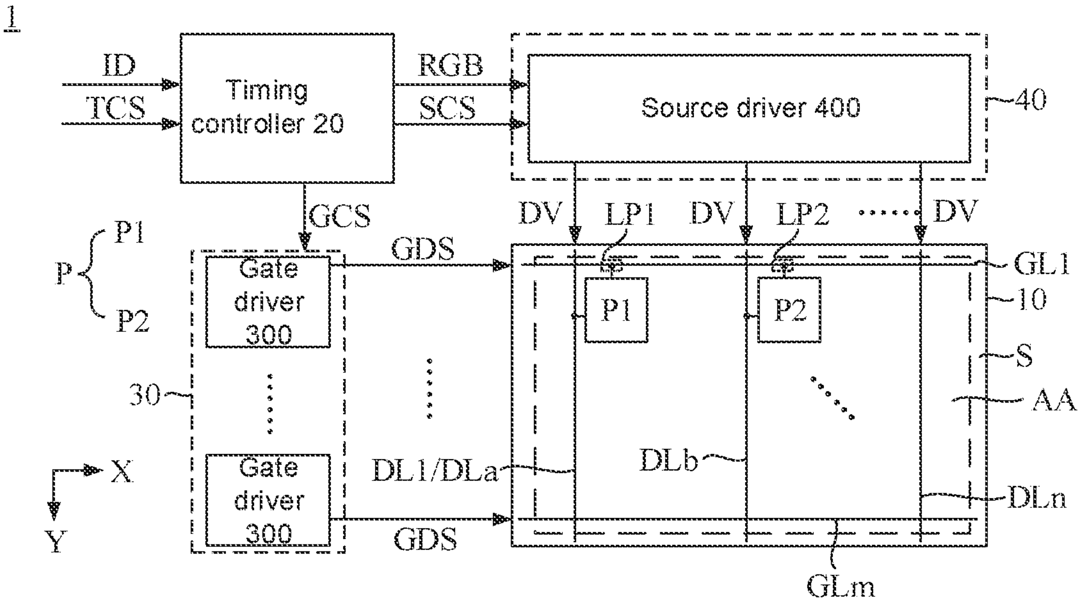
FIG. 1 is a structural diagram of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to. In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics described herein may be included in any one or more embodiments or examples in any suitable manner.

Hereinafter, the terms such as "first" and "second" are only used for descriptive purposes, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and they both include following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining" or "in response to detecting", depending on the context. Similarly, the phrase "if it is determined" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phase "applicable to" or "configured to" as used herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

As used herein, the term "about", "substantially" or "approximately" includes a stated value and an average value within an acceptable range of deviation of a particular value. The acceptable range of deviation is determined by a person of ordinary skill in the art in view of the measurement in question and errors associated with the measurement of a particular quantity (i.e., limitations of the measurement system).

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art in view of measurement in question and errors associated with the measurement of a particular quantity (i.e., limitations of the measurement system). For example, the term "parallel" includes absolute parallelism and approximate parallelism, and an acceptable range of deviation of the approximate parallelism may be a deviation within 5°; the term "perpendicular" includes absolute perpendicularity and approximate perpendicularity, and an acceptable range of deviation of the approximate perpendicularity may also be a deviation within 5°; and the term "equal" includes absolute equality and approximate equality, and an acceptable range of deviation of the approximate equality may be a difference between two equals being less than or equal to 5% of either of the two equals.

Some embodiments of the present disclosure provide a display apparatus. The display apparatus is configured to display images, such as still images or dynamic images. For example, the display apparatus may be a monitor, a television, a billboard, a home appliance, a large area wall, an information query device (e.g., a business inquiry device of departments such as an e-government department, a bank, a hospital and an electric power department), a cellphone, a personal digital assistant (PDA), a digital camera, a camcorder, or a navigator.

For example, referring to FIG. 1, the display apparatus 1 includes a display panel 10, a timing controller 20, a gate driving circuit 30 and a source driving circuit 40.

Referring to FIG. 1, the display panel 10 has a display area (also referred to as an active area) AA and a peripheral area S. The peripheral area S is located on at least one side of the display area AA. For example, the peripheral area S is disposed around the display area AA. The display panel 10 may be an organic light-emitting diode (OLED) panel, a quantum dot light-emitting diode (QLED) panel, a liquid crystal display (LCD) panel or a tiny light-emitting diode (a tiny LED, including mini-LED and micro-LED) panel, which is not limited herein. For convenience of description, the following description will be made by considering an example in which the display panel 10 is the OLED panel.

Figure 2:
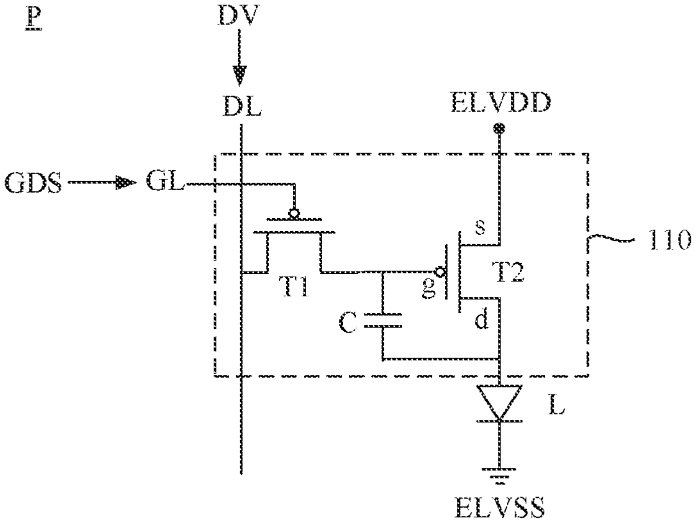
FIG. 2 is a structural diagram of a sub-pixel, in accordance with some embodiments.

For example, referring to FIGS. 1 and 2, the display panel 10 may include a plurality of signal lines, such as gate lines GL, data lines DL, and other driving control signal lines (e.g., light-emitting control signal lines). A gate line may be used to transmit a gate driving signal GDS, a data line is configured to transmit a data voltage DV (a data current or a data signal), and a driving control signal line (e.g., a light-emitting control signal line) may be used to transmit a driving control signal (e.g., a light-emitting control signal). A plurality of gate lines GL1 to GLm are arranged sequentially in a first direction Y, and a plurality of data lines DL1 to DLn are arranged sequentially in a second direction X, and both m and n are positive integers. The plurality of gate lines are arranged parallel to each other, and the plurality of data lines are also arranged parallel to each other. The plurality of gate lines and the plurality of data lines are arranged crosswise, for example, the plurality of gate lines and the plurality of data lines are arranged perpendicular to each other.

For example, referring to FIG. 1, the display panel 10 may further include a plurality of sub-pixels P located in the display area AA. For example, the plurality of sub-pixels P may be arranged in an array. For example, sub-pixels P arranged in a line in the second direction X are referred to as sub-pixels P in a same row, and sub-pixels P arranged in a line in the first direction Y are referred to as sub-pixels P in a same column. The plurality of sub-pixels P may include a sub-pixel of a first color that is configured to emit light of the first color, a sub-pixel of a second color that is configured to emit light of the second color, and a sub-pixel of a third color that is configured to emit light of the third color. For example, the first color, the second color and the third color are red, green and blue, respectively.

For example, referring to FIG. 2, at least one sub-pixel P (e.g., each sub-pixel P) in the display panel 10 includes a pixel circuit 110 and a light-emitting device L. The pixel circuit 110 is coupled to the light-emitting device L, and the pixel circuit 110 is configured to drive the light-emitting device L to emit light. For example, a plurality of pixel circuits 110 are also arranged in an array, and referring to FIG. 1, a position of the sub-pixel P that includes the pixel circuit 110 is a position of the pixel circuit 110.

Different types of display panels may adopt different types of light-emitting devices L. Corresponding to the type of the display panel, the light-emitting device L may be a LED, an OLED, or a QLED. The light-emitting device L includes a cathode, an anode, and a light-emitting functional layer located between the cathode and the anode. The light-emitting functional layer may include an emission layer EML, a hole transport layer HTL located between the emission layer and the anode, and an electron transport layer ETL located between the emission layer and the cathode. Of course, according to needs, in some embodiments, a hole injection layer HIL may further be provided between the hole transport layer HTL and the anode, and an electron injection layer EIL may further be provided between the electron transport layer ETL and the cathode.

For example, the anode may be made of a transparent conductive material with a high work function, and a material of the anode may include any of indium tin oxide (ITO), indium zinc oxide (IZO), indium gallium oxide (IGO), gallium zinc oxide (GZO), zinc oxide (ZnO), indium oxide ($In_2O_3$), aluminum zinc oxide (AZO) and carbon nanotubes or a combination of two or more thereof. For example, the cathode may be made of a material with a high conductivity and a low work function, and a material of the cathode may include any of or a combination of two or more of alloys such as a magnesium aluminum (MgAl) alloy and a lithium aluminum (LiAl) alloy, or any of or a combination of two or more of simple metals such as magnesium (Mg), aluminum (Al), lithium (Li) and silver (Ag). A material of the emission layer may be determined according to different colors of light emitted by the emission layer. For example, the material of the emission layer includes a fluorescent light-emitting material or a phosphorescent light-emitting material. For example, in at least one embodiment of the present disclosure, the emission layer may adopt a doping system. That is, a dopant material is mixed into a host light-emitting material to obtain a usable light-emitting material. For example, the host light-emitting material may be a metal compound material, a derivative of anthracene, an aromatic diamine compound, a triphenylamine compound, an aromatic triamine compound, a derivative of biphenyldiamine, or a triarylamine polymer.

A structure of the pixel driving circuit 110 may be designed according to actual situations, and is not limited in the embodiments of the present disclosure. For example, the pixel circuit 110 may be composed of electronic elements such as transistors and capacitor(s) C. The transistor may be a thin film transistor (TFT), or may be a field effect transistor (FEF). For example, referring to FIG. 2, the pixel circuit 110 may include two transistors (a switching transistor T1 and a driving transistor T2) and a capacitor C, so as to form a 2T1C structure. For another example, the pixel circuit 110 may include more than two transistors (a plurality of switching transistors and a driving transistor) and at least one capacitor C. For example, the pixel circuit 110 includes a capacitor C and seven transistors (six switching transistors and a driving transistor), so as to form a 7T1C structure.

Referring to FIG. 2, the pixel circuit will be described by considering an example of the 2T1C structure. An electrode (e.g., the anode) of the light-emitting device L is coupled to the pixel circuit, and another electrode (e.g., the cathode) of the light-emitting device L is coupled to a second power supply voltage terminal ELVSS. The second power supply voltage terminal ELVSS is configured to transmit a direct current voltage, such as a direct current low voltage. For example, the switching transistor T1 is turned on in response to a gate driving signal, a control electrode g and a drain d of the driving transistor T2 are coupled in response to a data signal, and a data voltage is applied to the control electrode g of the driving transistor T2, thus a current path between a first power supply voltage terminal ELVDD and the second power supply voltage terminal ELVSS is conducted. A driving current generated based on a voltage difference between a voltage of the control electrode g of the driving transistor T2 and a voltage of a first power supply voltage signal (a signal received at the first power supply voltage terminal ELVDD) is transmitted to the light-emitting device L through the current path, so as to drive the light-emitting device L to emit light.

For example, referring to FIG. 1, the timing controller 20 may receive initial image data ID and synchronization control signals TCS from a system (e.g., a mainboard in the display apparatus 1) to generate gate control signals GCS, image data RGB and source control signals SCS.

The synchronization control signals TCS input to the timing controller 20 may include a main clock signal (or referred to as a data sampling clock), a horizontal synchronization (HS) signal, a vertical synchronization (VS) signal, a data enable (DE) signal and other signals. The timing controller 20 generates the image data, the gate control signals GCS, and the source control signals SCS based on the initial image data ID and the synchronization control signals TCS. The image data RGB may be generated by correcting the initial image data ID. For example, the image data RGB may be obtained by performing image quality correction, spot correction, color characteristic compensation, and/or active capacitance compensation on the initial image data ID. The image data RGB may include red grayscale data, green grayscale data and blue grayscale data of different sub-pixels P.

For example, referring to FIG. 1, the timing controller 20 may output the generated gate control signals GCS to the gate driving circuit 30. The gate driving circuit 30 receives the gate control signals GCS, generate a plurality of gate driving signals GDS in response to the gate control signals GCS, and outputs the plurality of gate driving signals GDS respectively to the plurality of gate lines GL1 to GLm in the display panel, so as to control gating of all rows of sub-pixels P respectively coupled to the plurality of gate lines GL1 to GLm. The gate control signals GCS may include a start vertical (STV) signal, a clock pulse vertical (CPV) signal, an output enable (OE) signal, and the like. The STV signal is a start signal of starting scanning a frame of displayed image. The CPV signal is a clock signal of the gate driving circuit 30, and a cycle represents an output of a gate driving signal GDS. The setting of the OE signal will affect the output waveform of the gate driving signal GDS.

For example, the gate driving circuit 30 may scan the plurality of rows of sub-pixels P row by row. That is, the gate driving circuit 30 may output the gate driving signals GDS to the plurality of gate lines GL1 to GLm sequentially in an order from a first row of sub-pixels P to a last row of sub-pixels P.

In a possible implementation manner, the gate driving circuit 30 may include at least one gate driver 300 (e.g., a plurality of gate drivers 300), and each gate driver 300 is coupled to the timing controller 20. For example, the gate driving circuit 30 includes the plurality of gate drivers 300. According to the order in which the plurality of gate drivers 300 are arranged, the first gate driver 300 is coupled to the timing controller 20, and each of the remaining gate drivers 300 is coupled to a previous gate driver 300. That is, the plurality of gate drivers 300 are cascaded in sequence. The gate driver 300 may be mounted on the display panel 10 in a form of a chip, or may be connected to the display panel 10 in a form of a tape carrier package (TCP) or in a form of a chip on film (COF).

In another possible implementation manner, the gate driving circuit 30 may include at least one gate driver on array (GOA) circuit (e.g., a plurality of GOA circuits) for providing the gate driving signals GDS to the gate lines, thereby facilitating the reduction of a bonding process of external chips, the increase of production capacity and the reduction of manufacturing costs. In addition, the bezel of the display apparatus 1 may be narrow and a good display effect may be achieved.

For example, a driving manner of the display apparatus 1 is not limited, and the driving manner of the display apparatus 1 may be single-side driving or double-side driving. For example, referring to FIG. 1, the driving manner of the display apparatus 1 is the single-side I driving, and the gate driving circuit 30 includes the plurality of gate drivers 300. In a direction in which the plurality of data lines are arranged (i.e., the second direction X), the plurality of gate drivers 300 are all located on a same side of the plurality of data lines.

For example, with continued reference to FIG. 1, the timing controller 20 may output the generated image data RGB and the generated source control signals SCS to the source driving circuit 40. A signal format of the image data RGB and the source control signals SCS output by the timing controller 20 to the source driving circuit 40 is not limited. The signal format may be any of a plurality of signal formats such as a low voltage differential signal (LVDS), an embedded display port (eDP) signal, a transistor to transistor logic (TTL) signal, and a mini LVDS signal, and may be set by a person skilled in the art according to needs. For example, the timing controller 20 encodes the image data and the source control signals into LVDS signals, and output the LVDS signals to the source driving circuit 40. Compared with other signal formats, the LVDS signal has characteristics of high data transmission rate, low noise, low power consumption and long transmission distance, which is beneficial to achieve a better signal transmission effect.

For example, the source control signals SCS may include a start horizontal (STH) signal, a clock pulse horizontal (CPH) signal, a data transmission control signal (marked as TP or STB) and other signals. The STH signal represents the start of data transmission of a row of sub-pixels P. The CPH signal is a clock signal of the source driving circuit 40. The data transmission control signal is used to control the source driving circuit 40 to convert the image data RGB from the timing controller into a plurality of data voltages DV, and output the plurality of data voltages DV respectively to the plurality of data lines DL1 to DLn in the display panel 10, so as to output the plurality of data voltages DV to the plurality of rows of gated sub-pixels P. As a result, each sub-pixel P displays a corresponding color. The source driving circuit 40 may output the plurality of data voltages DV to the plurality of rows sub-pixels P in an order from the first row of sub-pixels P to the last row of sub-pixels P.

For example, the source driving circuit 40 may include at least one source driver 400 (e.g., one or more source drivers 400), and each source drivers 400 is coupled to the timing controller 20. The source driver 400 may also be provided in a form of a tape carrier package or in a form of a chip on film, which is not limited. For example, referring to FIG. 1, in a case where the source driving circuit 40 includes a single source driver 400, the plurality of data lines DL1 to DLn in the display apparatus are all coupled to the source driver 400. For another example, the source driving circuit 40 includes a plurality of source drivers 400, and the plurality of data lines DL1 to DLn in the display apparatus may be divided into a plurality of data line groups (not shown in the figures), and data lines in each data line group are coupled to a same source driver 400.

With continued reference to FIG. 1, the display apparatus 1 is developing toward a large size and a high resolution trend. With the increase of the size of the display apparatus 1, the length of the gate lines increases in the second direction X, the length of the data lines increases in the first direction Y, and resistance values of the gate lines and the data lines also increase accordingly. The gate lines and the data lines are arranged crosswise. With the improvement of the resolution of the display apparatus 1, the numbers of the gate lines and the data lines increase, and the number of cross positions between the gate lines and the data lines also increases, so that parasitic capacitance increases. The increase of the resistance value and the increase of the parasitic capacitance make both the gate lines and the data lines have large resistance and capacitance loads (RC loadings). In a process of signal transmission, a large RC loading may weaken the strength of the transmitted signal, resulting in signal attenuation to a great extent. For the gate line, a large RC Loading will cause the waveform of the gate driving signal GDS to be seriously distorted at a position of the gate line away from the gate driving circuit 30.

For example, referring to FIG. 1, the plurality of data lines DL1 to DLn include a first data line DLa and a second data line DLb. The same row of sub-pixels P include a first sub-pixel P1 and a second sub-pixel P2, the first sub-pixel P1 is coupled to the first data line DLa, and the second sub-pixel P2 is coupled to the second data line DLb. In the second direction X, the first data line DLa is located on a side of the second data line DLb proximate to the gate driving circuit 30, and the first data line DLa and the second data line DLb may be adjacent or have at least one data line (e.g., one or more data lines) therebetween. FIG. 1 shows an example in which the first data line DLa is adjacent to the second data line DLb. In the second direction X, the first sub-pixel P1 is located on a side of the second sub-pixel P2 proximate to the gate driving circuit 30. The first sub-pixel P1 and the second sub-pixel P2 are coupled to a same gate line GL. A portion of the gate line GL coupled to the first sub-pixel P1 is a first gate line portion LP1, and a portion of the gate line GL coupled to the second sub-pixel P2 is a second gate line portion LP2. For the gate line GL, due to the existence of the RC Loading, the attenuation degree of the gate driving signal GDS transmitted to the second gate line portion LP2 is greater than the attenuation degree of the gate driving signal GDS transmitted to the first gate line portion LP1.

Figure 3:
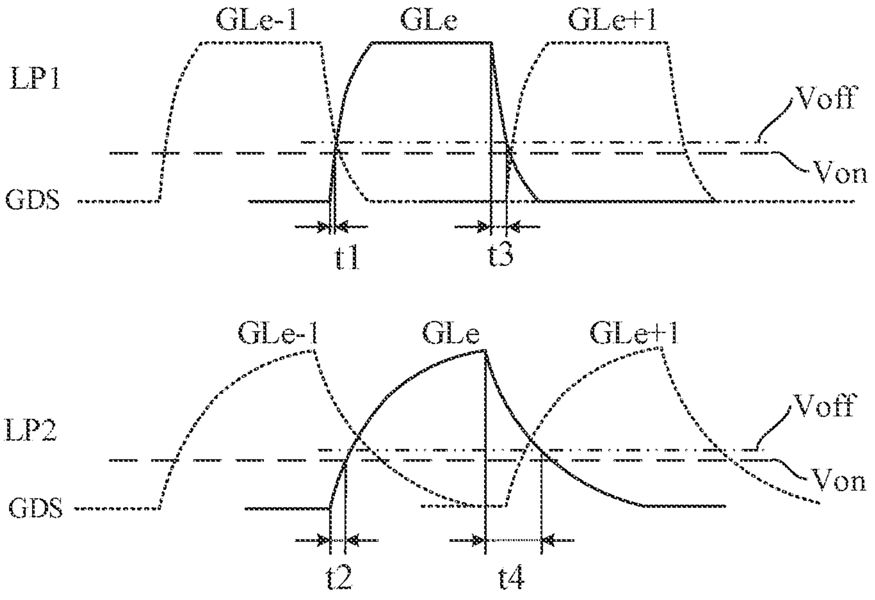
FIG. 3 is a waveform diagram of a gate driving signal at different positions of a gate line, in accordance with some embodiments.
Figure 4:
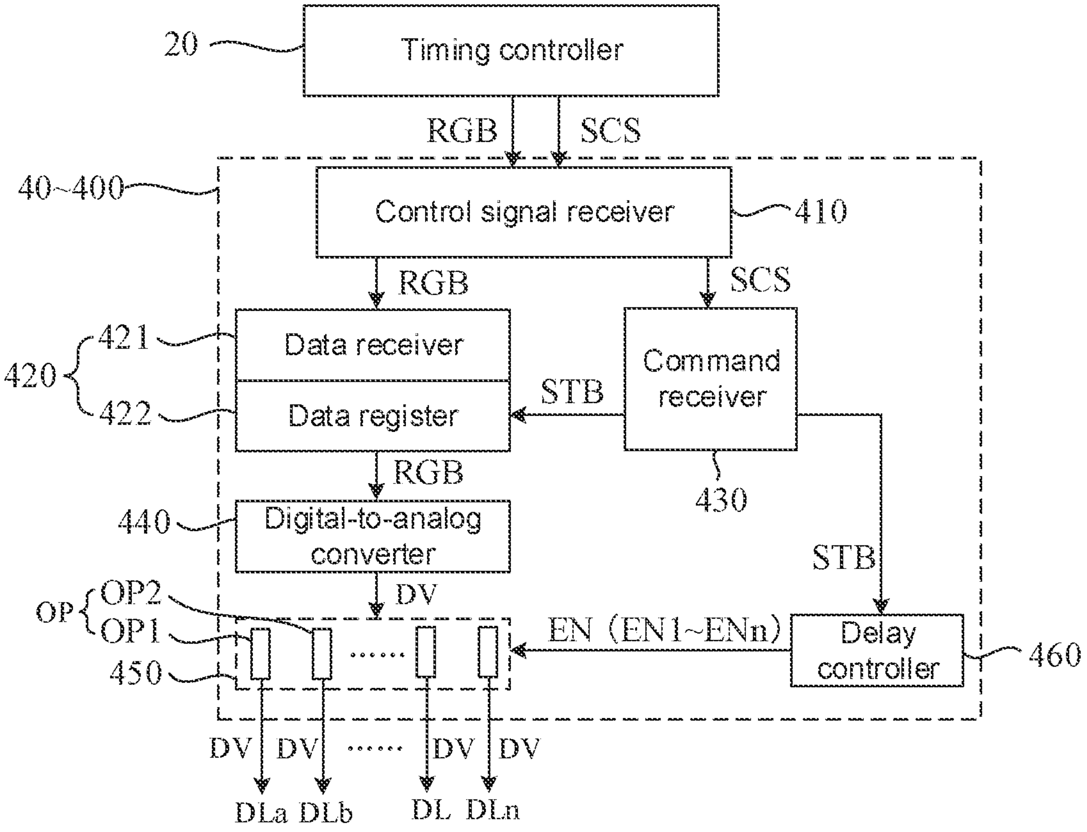
FIG. 4 is a structural diagram of a source driving circuit, in accordance with some embodiments.

In combination with the pixel circuit in FIG. 2, in a case where a potential of the gate driving signal GDS is higher than a turn-on voltage Von of the switching transistor T1 in the pixel circuit, the source and the drain of the switching transistor are conducted, so that the data voltage DV may be written into the sub-pixel P. In a case where the potential of the gate driving signal GDS is lower than a turn-off voltage Voff of the switching transistor in the pixel circuit, the switching transistor is turned off, so that the data voltage DV cannot be written. Referring to FIGS. 1 and 3, for an e-th gate line GLe, the waveforms of the gate driving signal GDS transmitted to the first gate line portion LP1 of the gate line GLe and transmitted to the second gate line portion LP2 of the gate line GLe is shown in FIG. 4, where e is a positive integer, and e is less than or equal to (m−1) (i.e., e≤(m−1)). The time required for the potential of the gate driving signal GDS transmitted to the first gate line portion LP1 of the gate line GLe to reach the turn-on voltage Von is t1, while the time required for the potential of the gate driving signal GDS transmitted to the second gate line portion LP2 of the gate line GLe to reach the turn-on voltage Von is t2 due to the signal attenuation caused by RC Loading, and t2 is greater than t1 (i.e., t2>t1). That is, compared with a switching transistor (which is referred to as a first switching transistor hereinafter) in the first sub-pixel P1 coupled to the first gate line portion LP1, a switching transistor (which is referred to as a second switching transistor hereinafter) in the second sub-pixel P2 coupled to the second gate line portion LP2 is turned on in delay, so that the data voltage DV cannot be written into the second sub-pixel P2 normally. In this case, a charging rate of the second sub-pixel P2 is lower than a charging rate of the first sub-pixel P1, and thus light-emitting brightness of the second sub-pixel P2 that is insufficiently charged is lower than light-emitting brightness of the first sub-pixel P1, which may ultimately affect the display effect adversely.

In addition, the signal attenuation caused by RC Loading also affects the turn-off of the switching transistor. With continued reference to FIGS. 1 and 3, the time required for the first switching transistor to be turned off is t3, and the time required for the second switching transistor to be turned off is t4, t4 is greater than t3 (i.e., t4>t3). That is, compared with the first switching transistor, the second switching transistor is turned off in delay, so that the data voltages DV of the (e+1)-th row of sub-pixels P may be wrongly written into the e-th row of sub-pixels P when the data voltages DV of the (e+1)-th row of sub-pixels P are written, which may increase the risk of uneven color display of the display apparatus 1 and is not conducive to the improvement of the display quality.

In order to reduce the risk that the above problems occur, referring to FIG. 4, some embodiments of the present disclosure provide a source driver 400. The source driver 400 includes a data buffer 420, a digital-to-analog converter 440, an output buffer 450 and other circuit modules. It will be understood that, only the circuit modules related to the embodiments of the present disclosure will be introduced, and other irrelevant circuit modules will be omitted.

For example, referring to FIG. 4, the data buffer 420 is configured to receive and latch the image data RGB, and output the image data RGB in response to a first triggering moment L1 of the data transmission control signal STB. The data buffer 420 includes a data receiver 421 and a data register 422. The data receiver 421 and the data register 422 work in parallel. The data receiver 421 obtains image data RGB of sub-pixels in an (i−1)-th row (i is a positive integer and i is less than or equal to m (i≤m)) sequentially and then transmits the image data RGB to the data register 422 simultaneously. The data register 422 stores the image data RGB of the sub-pixels in the (i−1)-th row. After the image data RGB of the sub-pixels in the (i−1)-th row is processed by subsequent circuit modules, data voltages of the sub-pixels in the (i−1)-th row are output to the sub-pixels in the (i−1)-th row. At the same time, the data receiver 421 receives image data RGB of sub-pixels in an i-th row. The data receiver 421 and the data register 422 work in parallel, which may improve the work efficiency of the source driver 400. For example, the data receiver 421 may include a plurality of data receiving units (not shown in the figures) for registering the image data RGB, and the data register 422 may include a plurality of data buffer units (not shown in the figures) for outputting the image data RGB. The number of the plurality of data receiving units is related to the number of the data lines DL coupled to the source driver 400 and the number of input bits of the image data RGB. For example, the source driver 400 is coupled to n data lines DL, and a color depth of each sub-pixel is 8 bits, then the number of input buffer units required is 8n, and similarly, the number of output buffer units required is also 8n.

Figure 5:
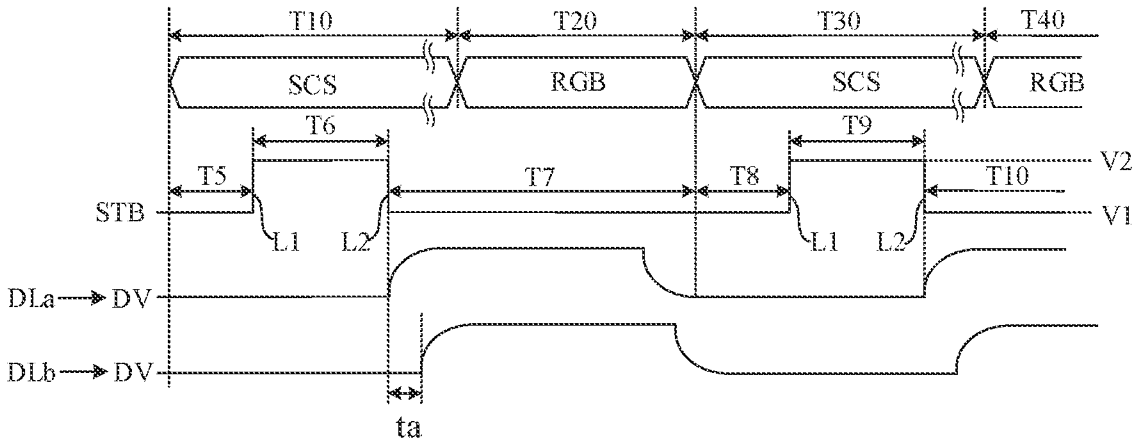
FIG. 5 is a timing diagram of transmission of a source control signal and image data, in accordance with some embodiments.

For example, referring to FIGS. 4 and 5, the data transmission control signal STB may be a control command (also referred to as control command data), which includes a control command start duration (STB Start) and a control command pulse width duration (STB Width). In addition, the data transmission control signal STB has a first triggering moment L1 and a second triggering moment L2. The control command start duration starts at the moment when the last data voltage DV of a former row of sub-pixels P is output, and ends at the moment when the data buffer 420 starts to output the image data RGB of a latter row of sub-pixels P. The control command pulse width duration starts at the moment when the image data RGB of the latter row of sub-pixels P starts to be output, and ends at the moment when the data voltages DV of the latter row of sub-pixels P starts to be output to the display panel. An ending moment of the control command start duration arrives at a same time as a start moment of the control command pulse width duration, and the arrival moment is the first triggering moment L1 of the data transmission control signal STB. An ending moment of the control command pulse width duration is the second triggering moment L2 of the data transmission control signal STB. The image data RGB input into the source driver 400 is latched at the first triggering moment L1, and the plurality of data voltages DV obtained by converting the image data RGB are output to the display panel at the second triggering moment L2.

The number of bits of the control command start duration and the number of bits of the control command pulse width duration may be the same or different. For example, the control command start duration may be a 10-bit digital signal, the control command pulse width duration may also be a 10-bit digital signal, and the two both correspond to 210 (1024) durations. If the control command start duration is, for example, 480, it means that the control command start duration is 480 unit durations. If the control command pulse width duration is, for example, 960, it means that the control command pulse width duration is 960 unit durations. A single unit duration may be a period of a clock. For another example, the control command start duration may be an 8-bit digital signal, which corresponds to 28 (256) durations, and the control command pulse width duration is a 10-bit digital signal, which corresponds to 210 (1024) durations. The control command start duration is, for example, 255, and the control command pulse width duration is, for example, 600.

For example, referring to FIGS. 4 and 5, the data transmission control signal STB may be a pulse signal for controlling the data buffer 420, and the data transmission control signal STB has a first triggering moment L1 and a second triggering moment L2. The image data RGB input into the source driver 400 is latched at the first triggering moment L1, and the plurality of data voltages DV obtained by converting the image data RGB are output to the display panel at the second triggering moment L2. An edge of the data transmission control signal STB from the first level V1 to the second level V2 is the first triggering moment L1 of the data transmission control signal STB, and an edge of the data transmission control signal STB from the second level V2 to the first level V1 is the second triggering moment L2 of the data transmission control signal STB. The first level V1 and the second level V2 are relative. For example, in case where the first level V1 is a high level, the second level V2 is a low level. The first level V1 may be a high level or a low level. FIG. 5 illustrates an example in which the first level V1 is the low level and the second level V2 is the high level. In this case, the first triggering moment L1 of the data transmission control signal STB is a rising edge, and the second triggering moment L2 of the data transmission control signal STB is a falling edge.

For example, the digital-to-analog converter 440 is configured to receive the image data RGB output by the data buffer 420, and convert the image data RGB into the plurality of data voltages DV (also referred to as gray-scale voltages) having an analog form. The digital-to-analog converter 440 may generally perform digital-to-analog conversion by selecting analog voltages generated by a gray-scale voltage generating circuit (not shown in the figures) corresponding to the image data RGB. The digital-to-analog converter 440 may include a plurality of digital-to-analog conversion units (not shown in the figures), and the plurality of digital-to-analog conversion units may convert the image data RGB into the plurality of corresponding data voltages DV. According to the above example, the digital-to-analog converter 440 may include 8n digital-to-analog conversion units.

For example, referring to FIGS. 4 and 5, the output buffer 450 includes a plurality of output channels OP. The output buffer 450 is configured to output the plurality of data voltages DV respectively through the plurality of output channels OP based on the second triggering moment L2 of the data transmission control signal STB. The number of the output channels OP in the output buffer 450 is equal to the number of the data lines DL coupled to the source driver 400. For example, the source driver 400 is coupled to n data lines DL, so the number of the output channels OP in the output buffer 450 is n. A moment when at least one output channel OP (e.g., the plurality of output channels OP) outputs the data voltages DV is not earlier than an arrival moment of the second triggering moment L2 of the data transmission control signal STB.

For example, with continued reference to FIG. 4, in addition to the data buffer 420, the digital-to-analog converter 440 and the output buffer 450, the source driver 400 may further include a control signal receiver 410. The control signal receiver 410 is configured to: receive both the image data RGB and the source control signals SCS that are encoded by the timing controller 20; separate the image data RGB and the source control signals SCS that are encoded by the timing controller 20; and transmit the separated image data RGB and source control signals SCS to respective circuit modules in the source driver 400. The control signal receiver 410 may be an interface, and a type of the interface may be set according to the signal format output by the timing controller 20. For example, in a case where the timing controller 20 outputs an eDP signal, the control signal receiver 410 is an eDP interface; in a case where the timing controller 20 outputs a TTL signal, the control signal receiver 410 is a TTL interface; and in a case where the timing controller 20 outputs an LVDS signal, the control signal receiver 410 is an LVDS interface. The type and the number of data ports of the interface may be set according to actual needs, which is not limited in the embodiments of the present disclosure.

For example, referring to FIG. 4, the source driver 400 may further include a command receiver 430. The command receiver 430 is configured to receive the source control signals SCS from the control signal receiver 410, and transmit a plurality of signals included in the source control signals SCS to respective circuit modules.

For example, referring to FIGS. 4 and 5, the image data RGB and the source control signals SCS may be transmitted in a time division manner. For example, source control signals SCS of sub-pixels in a row (e.g., in an f-th row, f is a positive integer less than or equal to (n−1) (i.e., $f \le (n-1)$)) may be transmitted first in the period T10, then image date RGB of the sub-pixels in the f-th row may be transmitted in the subsequent period T20, and source control signals SCS of sub-pixels in an (f+1)-th row may be transmitted in the subsequent period T30, and then image data RGB of the sub-pixels in the (f+1)-th row may be transmitted in the subsequent period T40, and so on. The period T5 (the duration is determined by the control command start duration of the data transmission control signal STB) is a buffering period after the last data voltage DV of an (f−2)-th row of the sub-pixels is output. The data register 422 in the data buffer 420 outputs image data RGB of sub-pixels in an (f−1)-th row to the digital-to-analog converter 440 in response to the first triggering moment L1 of the data transmission control signal STB. In period T6 (the duration is determined by the control command pulse width duration of the data transmission control signal STB), the digital-to-analog converter 440 converts the received image data RGB into the plurality of data voltages DV, and outputs the converted plurality of data voltages DV to the output buffer 450. Based on the second triggering moment L2 of the data transmission control signal STB, the output buffer 450 starts to output the data voltages DV of the sub-pixels in the (f−1)-th row. In period T7, the output buffer 450 outputs the plurality of data voltages DV of the sub-pixels in the (f−1)-th row to the data lines DL through the plurality of output channels. Similarly, in period T8 to period T10, the image data RGB of the sub-pixels P in the f-th row is processed.

In a case where the waveform of the gate driving signal transmitted by the gate line is seriously distorted due to RC Loading, compared with turn-on and turn-off of the first switching transistor in the first sub-pixel coupled to the gate line, turn-on and turn-off of the second switching transistor in the second sub-pixel coupled to the gate line are both delayed. In this case, for example, referring to FIGS. 4 and 5, a time difference may be set between output moments of at least two output channels OP. The time difference between moments at which any two data lines DL receive data voltages DV may be the same or different. The plurality of output channels OP include a first output channel OP1 and a second output channel OP2. The first output channel OP1 is coupled to the first sub-pixel through the first data line DLa, the second output channel OP2 is coupled to the second sub-pixel through the second data line DLb, and there is a time difference between an output moment of the first output channel OP1 (hereinafter referred to as the first moment) and an output moment of the second output channel OP2 (hereinafter referred to as the second moment). For example, in the second direction X, the first sub-pixel and the second sub-pixel are arranged adjacent to each other, and the first data line DLa and the second data line DLb are also arranged adjacent to each other. The moment when the first data line DLa receives the data voltage DV is earlier than the moment when the second data line DLb receives the data voltage DV, and the time difference therebetween is ta. That is, the second moment is delayed by ta than the first moment, where ta may be set according to the time of the turn-on moment of the second switching transistor delayed relative to the turn-on moment of the first switching transistor, or may be adjusted according to a line resistance of each gate line or the RC loading corresponding to each gate line.

In the adjusted display apparatus, the time difference between moments at which two adjacent sub-pixels in the second direction X receive the data voltages DV is substantially the same as the time difference between the turn-on moments of the switching transistors in the two sub-pixels. As a result, a difference between the charging rates of the two sub-pixels may be reduced, so that the light-emitting brightness may be relatively uniform. In addition, after the last data voltage DV of the former row of sub-pixels is output, the data voltages DV of the latter row of sub-pixels will be output. In case where the output of the data voltages DV of the former row of sub-pixels is delayed, the output of the data voltages DV of the latter row of sub-pixels will be delayed accordingly. As a result, in a case where the switching transistors of the sub-pixels in the former row are turned off in delay, the data voltages DV of the sub-pixels in the latter row will not be wrongly written into the sub-pixels in the former row, which may reduce the risk of uneven color display of the display apparatus, and is conducive to the improvement of the display quality.

For example, referring to FIG. 4, in a direction where the plurality of output channels OP are arranged, the time difference between output moments of any two adjacent output channels OP is the same. That is, in the second direction X, the time difference between moments at which any two adjacent data lines DL receive the data voltages DV is the same (e.g., all is ta). On a premise of improving the display effect, this setting may help simplify the design of the source driver 400.

Figure 6:
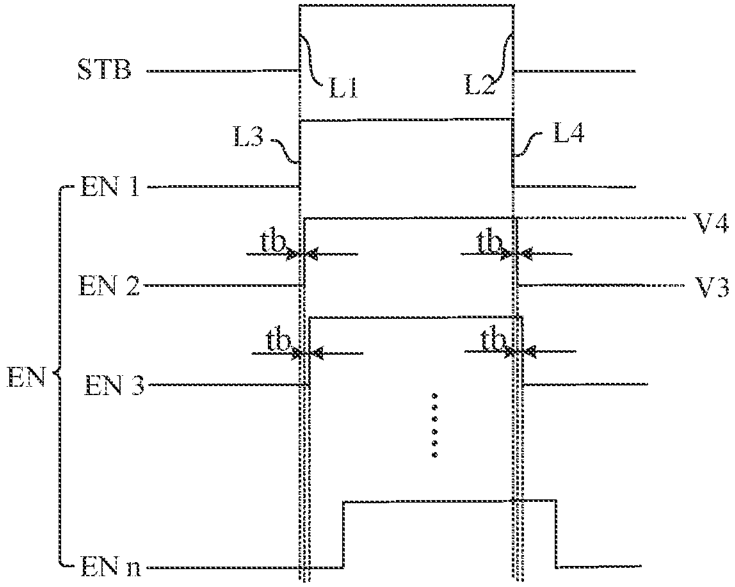
FIG. 6 is a waveform diagram of output enable signals, in accordance with some embodiments.

For example, referring to FIGS. 4 and 6, the source driver 400 further includes at least one delay controller 460 (e.g., a single delay controller 460), and the delay controller 460 is configured to output a plurality of output enable signals EN based on the data transmission control signal STB. The output buffer 450 is configured to output the plurality of data voltages DV respectively through the plurality of output channels OP in response to the plurality of output enable signals EN. The plurality of data lines DL1 to DLn arranged sequentially in the second direction X are respectively coupled to the plurality of output channels OP, and the plurality of output enable signals EN to which the plurality of output channels OP respectively respond are the output enable signals EN1 to ENn.

A manner of obtaining the plurality of output enable signals EN is not limited. For example, the delay controller 460 may store therein the plurality of output enable signals EN, and the delay controller 460 receives the data transmission control signal STB from the command receiver 430 and responds to the second triggering moment L2 of the data transmission control signal STB to output the plurality of output enable signals EN stored therein to the output buffer 450, so as to control the output of the plurality of output channels OP. For another example, the delay controller 460 may reflect the delay information of each output channel OP in the data transmission control signal according to the received data transmission control signal STB, so as to generate the plurality of output enable signals EN.

For example, an edge of the output enable signal EN from the third level V3 to the fourth level V4 is a first triggering moment L3 of the output enable signal EN, and an edge of the output enable signal EN from the fourth level V4 to the third level V3 is a second triggering moment L4 of the output enable signal EN. Similar to the foregoing, the third level V3 and the fourth level V4 are relative. The third level V3 may be a high level and the fourth level V4 may be a low level; alternatively, the third level V3 may be the low level and the fourth level V4 may be the high level. The embodiments of the present disclosure will be described by considering an example in which the third level V3 is the low level and the fourth level V4 is the high level. In this case, the first triggering moment L3 of the output enable signal EN is a rising edge, and the second triggering moment L4 of the output enable signal EN is a falling edge. Each output channel OP of the output buffer 450 may output the data voltage DV in response to a signal triggering moment of an output enable signal EN, and the plurality of output channels may respectively output the plurality of data voltages DV in response to the plurality of signal triggering moments of the plurality of output enable signals EN. The plurality of signal triggering moments may all be the rising edges of the output enable signals EN or all be the falling edges of the output enable signals EN, which is not limited.

Figure 7:
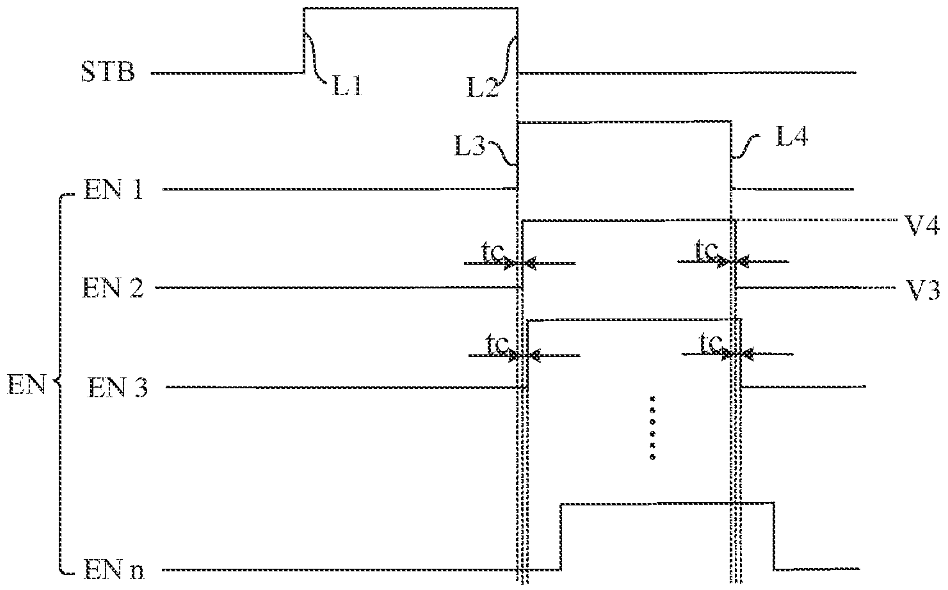
FIG. 7 is a waveform diagram of output enable signals, in accordance with some other embodiments.

For example, it is possible to set the plurality of output enable signals EN to have the same waveform, and at least two output enable signals EN to have a phase difference. For example, referring to FIG. 6, the waveforms of the plurality of output enable signals EN output by the delay controller are all the same, each output channel of the output buffer may output the data voltage in response to a second triggering moment L4 of the output enable signal EN, and the first triggering moment L3 of at least one (e.g., one) output enable signal EN arrives at the same time as the first triggering moment L1 of the data transmission control signal STB. In the direction where the plurality of output channels are arranged, there is a time difference between moments at which any two adjacent output channels output the data voltages. The first triggering moments L3 of the output enable signals EN to which any two adjacent output channels respond are staggered, and the second triggering moments L4 of the output enable signals EN to which any two adjacent output channels respond are staggered, and a time difference between arrival moments of two first triggering moments L3 is equal to a time difference between arrival moments of two second triggering moments L4. A first triggering moment L3 of an output enable signal EN1 is aligned with the first triggering moment L1 of the data transmission control signal STB, a second triggering moment L4 of the output enable signal EN1 is aligned with the second triggering moment L2 of the data transmission control signal STB, and the second triggering moments L4 of the output enable signals EN1 to ENn are delayed step by step, and the delay time is tb. It is equivalent to that the delay controller performs delay processing on the received data transmission control signal STB according to the preset delay information and outputs the processed data transmission control signal STB. For another example, referring to FIG. 7, the waveforms of the plurality of output enable signals EN output by the delay controller 460 are all the same, each output channel of the output buffer may output the data voltage in response to a first triggering moment L3 of the output enable signal EN, and the first triggering moment L3 of at least one (e.g., one) output enable signal EN arrives at the same time as the second triggering moment L2 of the data transmission control signal STB. In the direction where the plurality of output channels are arranged, there is a time difference between moments at which any two adjacent output channels output the data voltages. The first triggering moments L3 of the output enable signals EN to which any two adjacent output channels respond are staggered, and the second triggering moments L4 of the output enable signals EN to which any two adjacent output channels respond are staggered, and a time difference between arrival moments of two first triggering moments L3 is equal to a time difference between arrival moments of two second triggering moments L4. The first triggering moment L3 of the output enable signal EN1 is aligned with the second triggering moment L2 of the data transmission control signal STB, and the second trigger moments L4 of the output enable signals EN1 to ENn are delayed step by step, and the delay time is tc.

Figure 8:
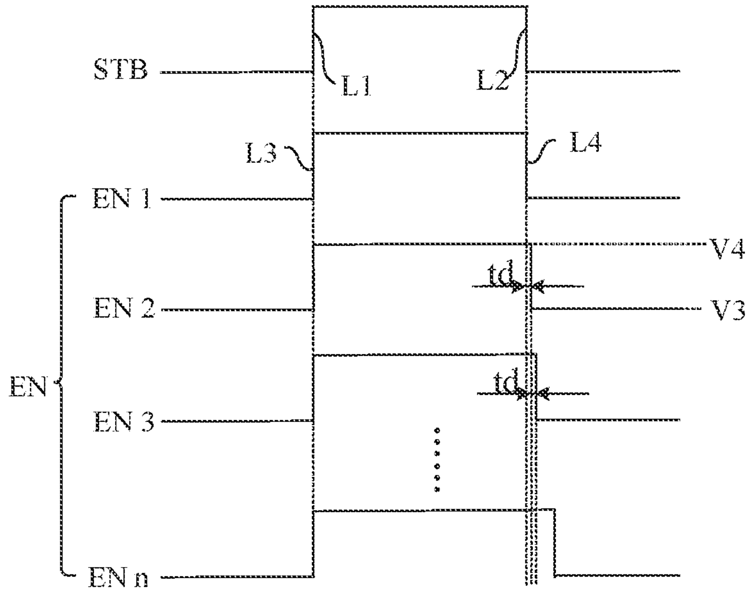
FIG. 8 is a waveform diagram of output enable signal, in accordance with yet other embodiments.

For another example, the waveforms of at least two output enable signals EN may be set different, and there is a time difference between arrival moments of triggering moments of two signals output by any two output enable signals EN with different waveforms. For example, referring to FIG. 8, the waveforms of any two output enable signals EN output by the delay controller are different, and each output channel of the output buffer may output the data voltage in response to the second triggering moment L4 of the output enable signal EN. The first triggering moments L3 of the plurality of output enable signals EN arrive at the same time as the first triggering moment L1 of the data transmission control signal STB, and an arrival moment of the second triggering moment L4 of at least one output enable signal EN (e.g., output enable signals EN) is later than an arrival moment of the second triggering moment L2 of the data transmission control signal STB. The first triggering moments L3 of the output enable signals EN1 to ENn all arrive at the same time as the first triggering moment L1 of the data transmission control signal STB, the second triggering moment L4 of the output enable signal EN1 arrives at the same time as the second triggering moment L2 of the data transmission control signal STB, and the second triggering moments L4 of the output enable signals EN1 to ENn are delayed step by step, and the delay time is td. In this way, it may be realized that different output channels output the data voltages by delaying different times, so that the charging rates of the sub-pixels in the same row may be relatively uniform.

Figure 9:
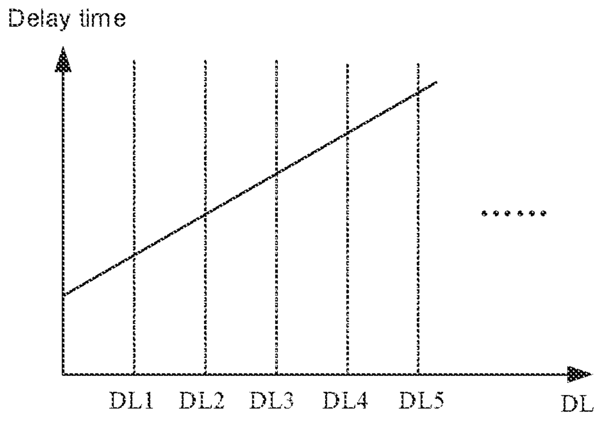
FIG. 9 is a diagram showing output delay of data lines in a display apparatus, in accordance with some embodiments.

Some embodiments of the present disclosure provide a display apparatus. The display apparatus includes the source driver as described above, and the plurality of output enable signals are arranged as described above. The display apparatus has a structure shown in FIG. 1. In a case where the driving manner of the display apparatus 1 is single-side driving, referring to FIG. 9, in the direction in which the plurality of data lines DL are arranged, moments at which the plurality of data lines DL respectively receive the plurality of data voltages DV are delayed step by step from one side of the display apparatus 1 to another side thereof, for example, delayed step by step from a side of the display apparatus 1 where the gate driving circuit 30 is provided to another side of the display apparatus 1 where no gate driving circuit 30 is provided.

For another example, the display apparatus includes the source driver as described above, and the plurality of output enable signals are arranged as described above. The display apparatus has a structure shown in FIG. 10. The driving manner of the display apparatus 1 is double-side driving. The display apparatus 1 includes a timing controller 20 and a plurality of gate drivers 300, and the plurality of gate drivers 300 are all coupled to the timing controller 20. In the second direction X, the plurality of gate drivers 300 include at least one first gate driver 310 (e.g., a plurality of first gate driver 310) on a side of the display apparatus 1 and at least one second source driver 320 (e.g., a plurality of second source driver 320) on another side of the display apparatus 1. A first gate driver 310 and a second gate driver 320 are coupled to a same gate line. The plurality of first gate drivers 310 constitute a first gate driving circuit 31, and the plurality of second gate drivers 320 constitute a second gate driving circuit 32. For a gate line, the gate driving signal GDS is input from two ends of the gate line, which is conducive to reducing the signal attenuation at a position of the gate line far away from the first gate driving circuit 31 and the second gate driving circuit 32.

In a case where the driving manner of the display apparatus 1 is the double-side driving, in the direction in which the plurality of data lines DL1 to DLn are arranged, from two sides of the display apparatus 1 to the middle thereof, the delay of turn-on and turn-off of the switching transistors in the sub-pixels P in the same row gradually increases. Correspondingly, the charging rates of the sub-pixels P also gradually decrease from the two sides of the display apparatus 1 to the middle thereof. As a result, the problem that the sub-pixels P away from the gate driving circuits 30 are insufficiently charged, and the data voltages DV of the sub-pixels P in the latter row are wrongly written into the sub-pixels P in the former row may exist.

Figure 11:
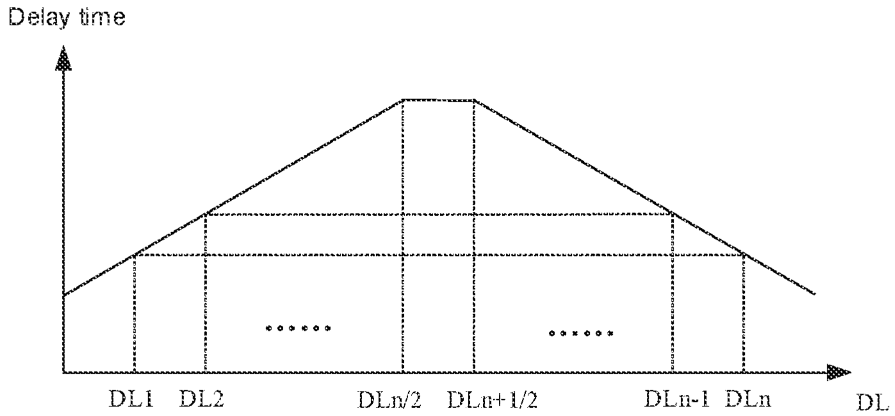
FIG. 11 is a diagram showing output delay of data lines in a display apparatus, in accordance with some other embodiments.
Figure 12:
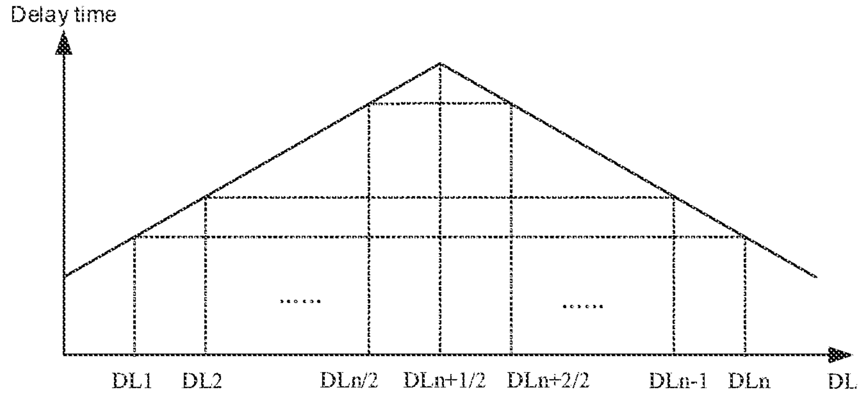
FIG. 12 is a diagram showing output delay of data lines in a display apparatus, in accordance with yet other embodiments.

Therefore, in order to avoid the above problems, in a case where the source driver 400 is coupled to n data lines DL1 to DLn, and n is a positive integer and an even number, referring to FIG. 11, moments at which output channels output data voltages to data lines DL1 to DLn/2 are delayed step by step, and moments at which output channels output data voltages to data lines DLn to DL(n+1)/2 are delayed step by step. Correspondingly, the moments at which the plurality of data lines DL1 to DLn respectively receive the plurality of data voltages are symmetrically delayed step by step from the two sides of the display apparatus to the middle thereof. In a case where the source driver is coupled to n data lines DL1 to DLn, and n is a positive integer and an odd number, referring to FIG. 12, moments at which output channels output data voltages to data lines DL1 to DL(n+1)/2 are delayed step by step, and moments at which output channels output data voltages to data lines DLn to DL(n+1)/2 are delayed step by step.

Figure 10:
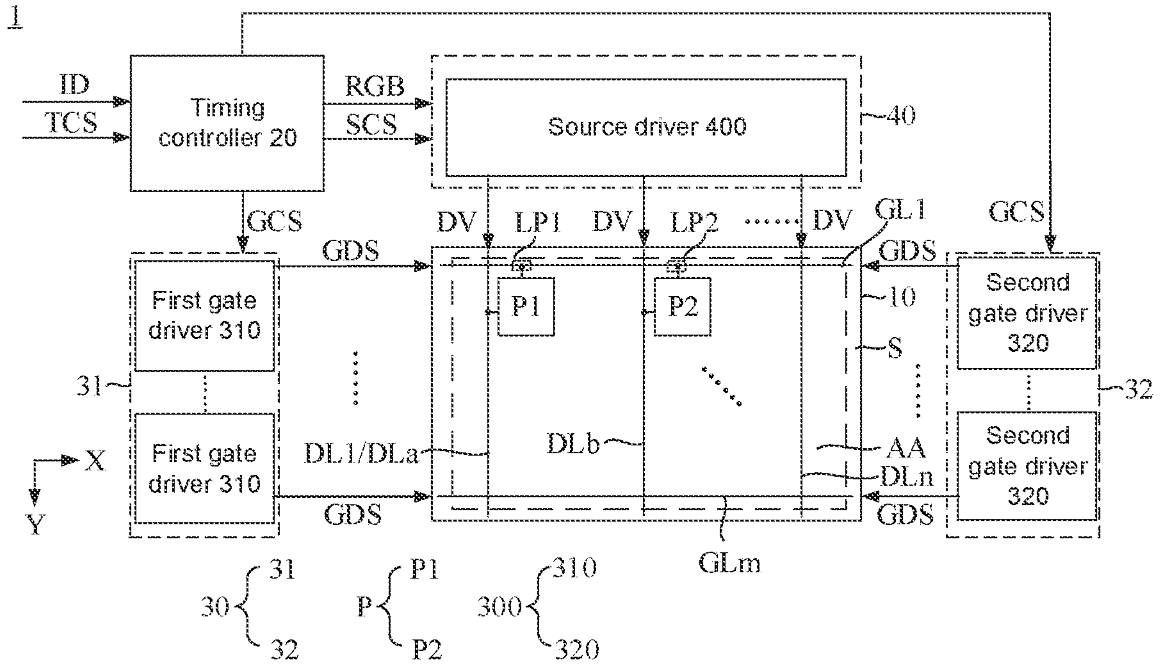
FIG. 10 is a structural diagram of another display apparatus, in accordance with some embodiments.

For example, referring to FIG. 10, the plurality of gate lines GL1 to GLm in the display apparatus 1 may have an equal line resistance, and similarly, the plurality of data lines DL1 to DLn in the display apparatus 1 may also have an equal line resistance. Considering the gate lines as an example, in a case where the plurality of gate lines GL1 to GLm in the display apparatus 1 have the equal line resistance, when the delay time required for a data line to receive a data voltage DV is set according to the RC Loading, because of the RC loading at cross positions between the gate lines and the data lines, a corresponding relationship between the cross positions and the gate driving circuit 30 is approximately linear, which is conducive to reducing the design difficulty of the delay times corresponding to the plurality of data lines DL1 to DLn.

Figure 13:
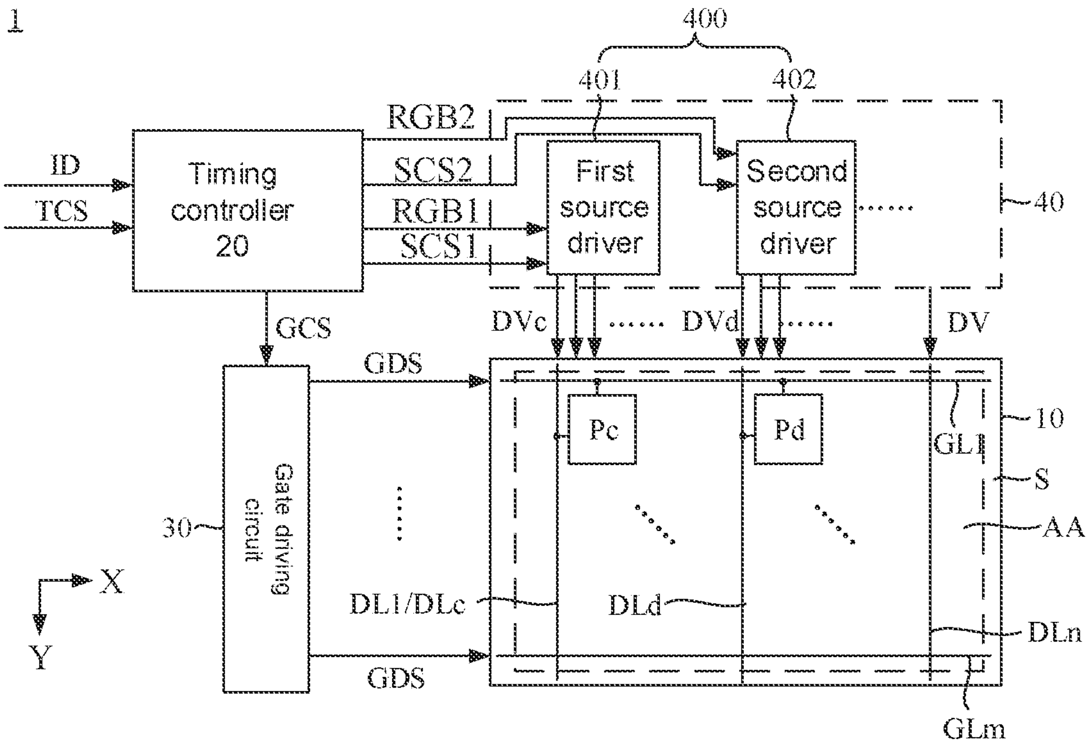
FIG. 13 is a structural diagram of yet another display apparatus, in accordance with some embodiments.
Figure 14:
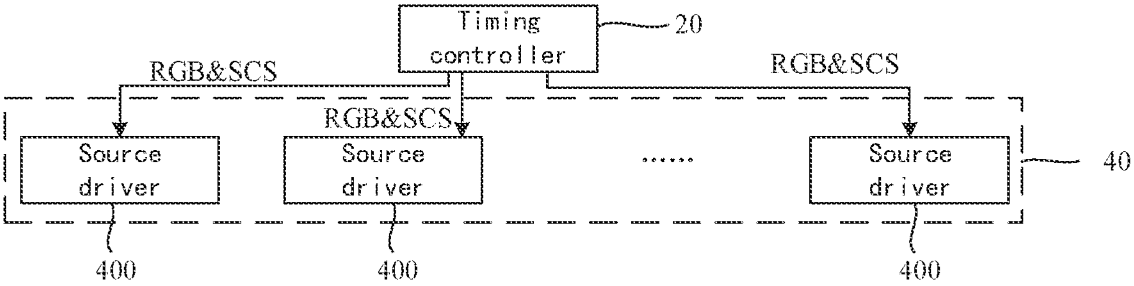
FIG. 14 is a diagram showing a coupling structure of a timing controller and a source driving circuit, in accordance with some embodiments.
Figure 15:
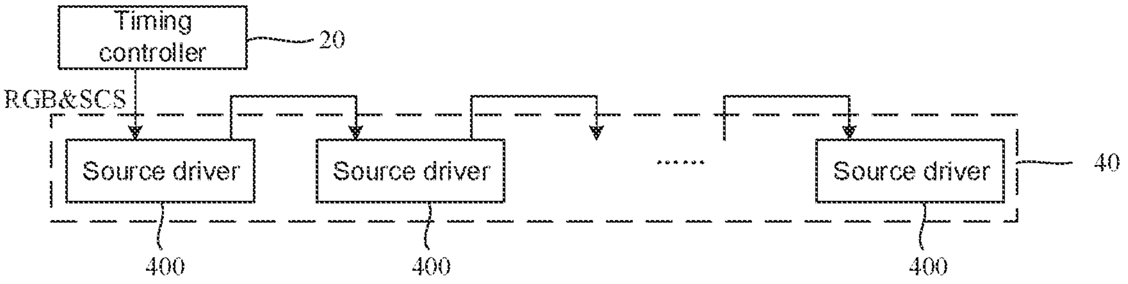
FIG. 15 is a diagram showing another coupling structure of a timing controller and a source driving circuit, in accordance with some embodiments.

In some other embodiments of the present disclosure, referring to FIG. 13, the display apparatus 1 includes a source driving circuit 40. The source driving circuit 40 includes a plurality of source drivers 400, and the plurality of source drivers 400 are all coupled to the timing controller 20. For example, referring to FIG. 14, the plurality of source drivers 400 may all be connected to the timing controller 20, and the timing controller 20 outputs image data RGB and source control signals SCS to each source driver 400. Each source driver 400 separates the received source control signal SCS to obtain the required data transmission control signal, and converts image data RGB and outputs a data voltage in response to the respective data transmission control signal. For another example, referring to FIG. 15, the source driving circuit 40 includes the plurality of source drivers 400 that are cascaded sequentially. At least one (e.g., one) source driver 400 is connected to the timing controller 20, and the image data RGB and the source control signals SCS output by the timing controller 20 are continuously transmitted from the source driver 400 to other source drivers 400. In addition to the above two arrangement manners, the plurality of source drivers 400 and the timing controller 20 may also adopt other possible connection manners, which is not limited in the embodiments of the present disclosure.

For example, referring to FIG. 13, the plurality of data lines DL1 to DLn in the display panel 10 may be divided into the plurality of data line groups (not shown in the figures), and data lines in each data line group are coupled to a same source driver 400. The plurality of source drivers 400 include a first source driver 401 and a second source driver 402. The timing controller 20 provides first image data RGB1 and first source control signals SCS1 for the first source driver 401, the first source control signals SCS1 include a first data transmission control signal; and the timing controller 20 provides second image data RGB2 and second source control signals SCS2 for the second source driver 402, the second source control signals SCS2 include a second data transmission control signal. The first source driver 401 and the second source driver 402 each convert the image data RGB into data voltages DV in response to a respective data transmission control signal, and output the data voltages DV to the display panel 10. A relative position between the first source driver 401 and the second source driver 402 is not limited, and the first source driver 401 and the second source driver 402 may or may not be adjacent. In the second direction X, the first source driver 401 may be located on a left side of the second source driver 402 or on a right side of the second source driver 402. The plurality of data line groups in the display panel 10 include a first data line group and a second data line group, multiple data lines in the first data line group are coupled to the first source driver 401, and multiple data lines in the second data line group are coupled to the second source driver 402. The first source driver 401 may simultaneously output a plurality of first data voltages to the multiple data lines in the first data line group, and the second source driver 402 may also simultaneously output a plurality of second data voltages to the multiple data lines in the second data line group.

For ease of description, with continued reference to FIG. 13, the following description will be made by considering an example in which the driving manner of the display apparatus 1 is the single-side driving, the first source driver 401 and the second source driver 402 are adjacent to each other, the first source driver 401 is located on a side of second source driver 402 proximate to the gate driving circuit 30, and the first source driver 401 is one of the plurality of source drivers 400 that is closest to the gate driving circuit 30.

Figure 16:
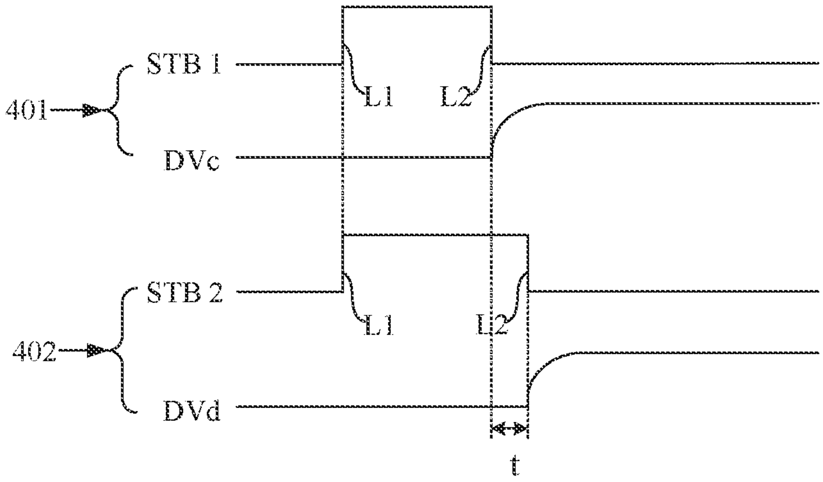
FIG. 16 is an output waveform diagram of a source driving circuit, in accordance with some embodiments.

For example, referring to FIG. 16, the data transmission control signal STB to which the first source driver 401 responds is a first data transmission control signal STB1, and the data transmission control signal STB to which the second source driver 402 responds is a second data transmission control signal STB2. The first data transmission control signal STB1 and the second data transmission control signal STB2 each have a first triggering moment L1 and a second triggering moment L2.

The first source driver 401 may convert the latched first image data into the plurality of first data voltages in response to the first triggering moment L1 of the first data transmission control signal STB1, and may output the plurality of first data voltages based on the second triggering moment L2 of the first data transmission control signal STB1. Similar to the first source driver 401, the second source driver 402 may convert the latched second image data into the plurality of second data voltages in response to the first triggering moment L1 of the second data transmission control signal STB2, and may output the plurality of second data voltages based on the second triggering moment L2 of the second data transmission control signal STB2. With continued reference to FIG. 16, there is a time difference between the second triggering moment L2 of the first data transmission control signal STB1 and the second triggering moment L2 of the second data transmission control signal STB2. For example, the second triggering moment L2 of the second data transmission control signal STB2 is delayed relative to the second triggering moment L2 of the first data transmission control signal STB1, the delay time is t, and the delay time may be adjusted based on the line resistance of each gate line or RC loading corresponding to each gate line.

Figure 17:
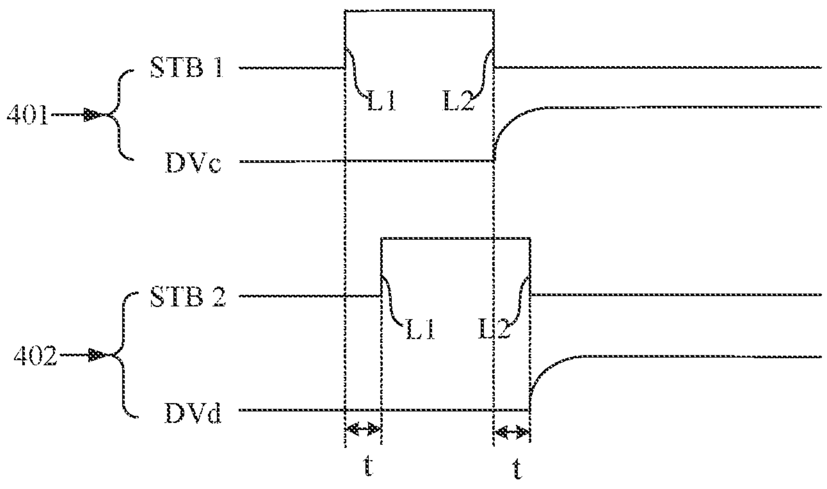
FIG. 17 is an output waveform diagram of another source driving circuit, in accordance with some embodiments.

Referring to FIGS. 13 and 17, the plurality of sub-pixels P in the display apparatus 1 include a preceding sub-pixel Pc and a succeeding sub-pixel Pd. In the second direction X, in data lines DL (constituting the first data line group and the second data line group) coupled to the first source driver 401 and the second source driver 402, two data lines DL with the same positions in the first data line group and the second data line group are respectively a preceding data line DLc and a succeeding data line DLd. The preceding sub-pixel Pc is coupled to the preceding data line DLc, and the succeeding sub-pixel Pd is coupled to the succeeding data line DLd. The preceding data line DLc transmits a preceding data voltage DVc, and the succeeding data line DLd transmits a succeeding data voltage DVd. For example, in the second direction X, the preceding data line DLc is a first data line in the first data line group, and the succeeding data line DLd is a first data line in the second data line group. In a case where a time difference between the turn-on moment of the switching transistor in the succeeding sub-pixel Pd and the turn-on moment of the switching transistor in the preceding sub-pixel Pc is t, the second triggering moment L2 of the second data transmission control signal STB2 is delayed relative to the second triggering moment L2 of the first data transmission control signal STB1, and the delay time is t. As a result, it may be possible to reduce the difference of charging rates between two sub-pixels, so that light-emitting brightness of the two sub-pixels is relatively uniform. In addition, the output of the plurality of data voltages DV of the former row of sub-pixels P is delayed, and the output of the plurality of data voltages DV of the latter row of sub-pixels P is also delayed accordingly, so that the data voltages DV of the sub-pixels P in the latter row will not be wrongly written into the sub-pixels P in the former row when the switching transistors of the sub-pixels P in the former row are turned off in delay, which may reduce the risk of uneven color display of the display apparatus 1.

The specific waveforms of the first data transmission control signal STB1 and the second data transmission control signal STB2 are not limited, as long as the second triggering moment L2 of the second data transmission control signal STB2 is delayed relative to the second triggering moment L2 of the first data transmission control signal STB1. For example, referring to FIG. 16, the waveform of the first data transmission control signal STB1 transmission control signal STB2, the first triggering moment L1 of the first data transmission control signal STB1 arrives at the same time as the first triggering moment L1 of the second data transmission control signal STB2, and the second triggering moment L2 of the second data transmission control signal STB2 is delayed by t relative to the second triggering moment L2 of the first data transmission control signal STB1. For another example, referring to FIG. 17, the waveform of the first data transmission control signal STB1 and the waveform of the second data transmission control signal STB2 are the same, there is a phase difference between the waveform of the first data transmission control signal STB1 and the waveform of the second data transmission control signal STB2, and there is a time difference between the first triggering moment L1 of the first data transmission control signal STB1 and the first triggering moment L1 of the second data transmission control signal STB2. The first triggering moment L1 of the second data transmission control signal STB2 is delayed relative to the first triggering moment L1 of the first data transmission control signal STB1, and the second triggering moment L2 of the second data transmission control signal STB2 is also delayed relative to the second triggering moment L2 of the first data transmission control signal STB1, and the delay time is t.

Referring to the foregoing description, the first source driver may include the circuit modules such as the data receiver, the data register, the digital-to-analog converter and the output buffer, and may also include other circuit modules. The circuit modules included in the second source driver are the same as that included in the first source driver, and details will not be repeated here.

For example, the first source driver includes the output buffer (hereinafter referred to as a first output buffer), and the first output buffer includes a plurality of output channels. The first output buffer is configured to output the plurality of first data voltages respectively through the plurality of output channels based on the second triggering moment of the first data transmission control signal, and there is a time difference between output moments of at least two output channels. For example, in the direction in which the plurality of output channels of the first output buffer are arranged, there is a time difference between moments at which any two adjacent output channels output the first data voltages. An output buffer (hereinafter referred to as a second output buffer) of the second source driver also includes a plurality of output channels, and the second output buffer is configured to output the plurality of second data voltages respectively through the plurality of output channels based on the second triggering moment of the second data transmission control signal. In the direction in which the plurality of output channels of the second output buffer are arranged, there is a time difference between moments at which any two adjacent output channels output the second data voltages. In the above arrangement, the delay time is adjusted in a unit of a single output channel, so that each source driver has a relatively continuous output delay variation, and the delay time may be finely adjusted, thereby effectively reducing the difference of charging rates between the sub-pixels in the same row, and improving the display effect.

Figure 18:
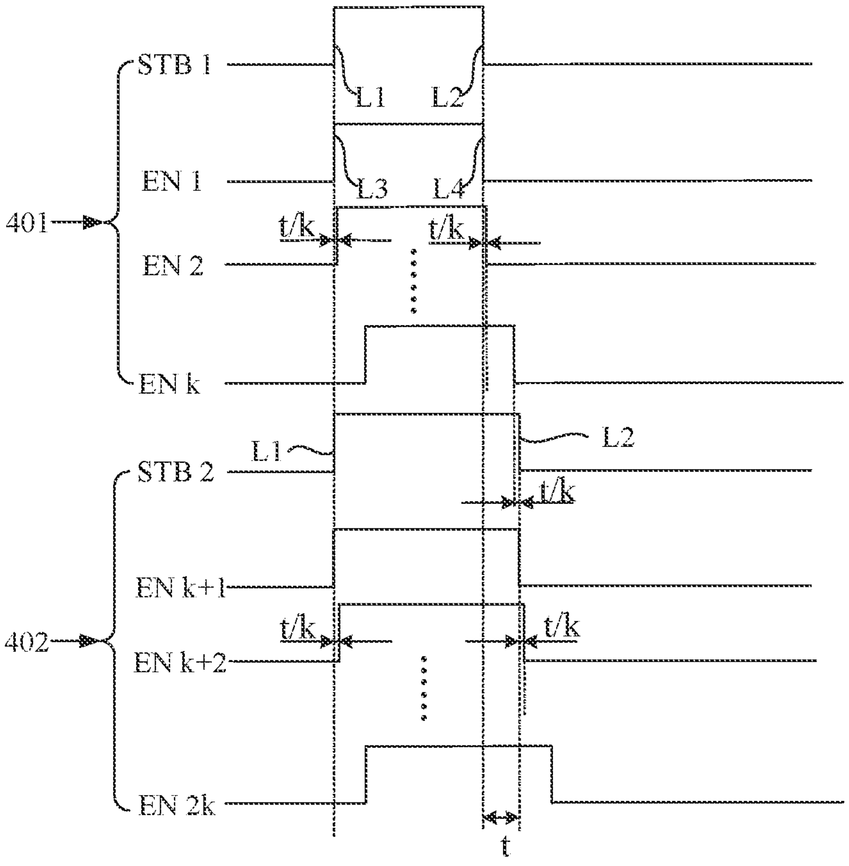
FIG. 18 is a waveform diagram of output enable signals, in accordance with some other embodiments.

For example, in the direction in which all the output channels are arranged, the time difference between the output moments of any two adjacent output channels is the same. That is, in the second direction X, the time difference between moments at which any two adjacent data lines receive the data voltages is the same. On the premise of adjusting the delay time finely in the unit of the single output channel to improve the display effect, this setting is conducive to simplifying the design of the source driver. The time difference between the output moments of any two adjacent output channels may be determined according to the time difference between the second triggering moment of the first data transmission control signal and the second triggering moment of the second data transmission control signal. For example, referring to FIG. 18, the time difference between the second triggering moment L2 of the first data transmission control signal STB1 and the second triggering moment L2 of the second data transmission control signal STB2 is t, and the number of data lines in the first data line group is equal to the number of data lines in the second data line group, which are both k. In the second direction X, the time difference between moments at which any two adjacent data lines receive the data voltages is the same. The time difference between moments at which any two adjacent data lines in the first data line group receive the first data voltages is t/k, the time difference between moments at which any two adjacent data lines in the second data line group receive the second data voltages is t/k, and in the second direction X, a time difference between the moment at which a first data line in the second data line group receives the second data voltage and the moment at which a k-th data line in the first data line group receives the first data voltage is also t/k.

For example, the first source driver further includes at least one (e.g., one) delay controller (hereinafter referred to as a first delay controller), and the first delay controller is configured to output a plurality of output enable signals based on the first data transmission control signal. The first output buffer is configured to output the plurality of first data voltages through the plurality of output channels thereof in response to the plurality of output enable signals. The manner of obtaining the plurality of output enable signals is not limited. For example, the first delay controller may store therein the plurality of output enable signals, and the first delay controller receives the first data transmission control signal from a command receiver and responds to the second triggering moment of the first data transmission control signal to output the stored plurality of output enable signals to the first output buffer, so as to control the output of the plurality of output channels. For another example, the first delay controller may reflect the delay information of each output channel in the first data transmission control signal according to the received first data transmission control signal, so as to generate the plurality of output enable signals.

Figure 19:
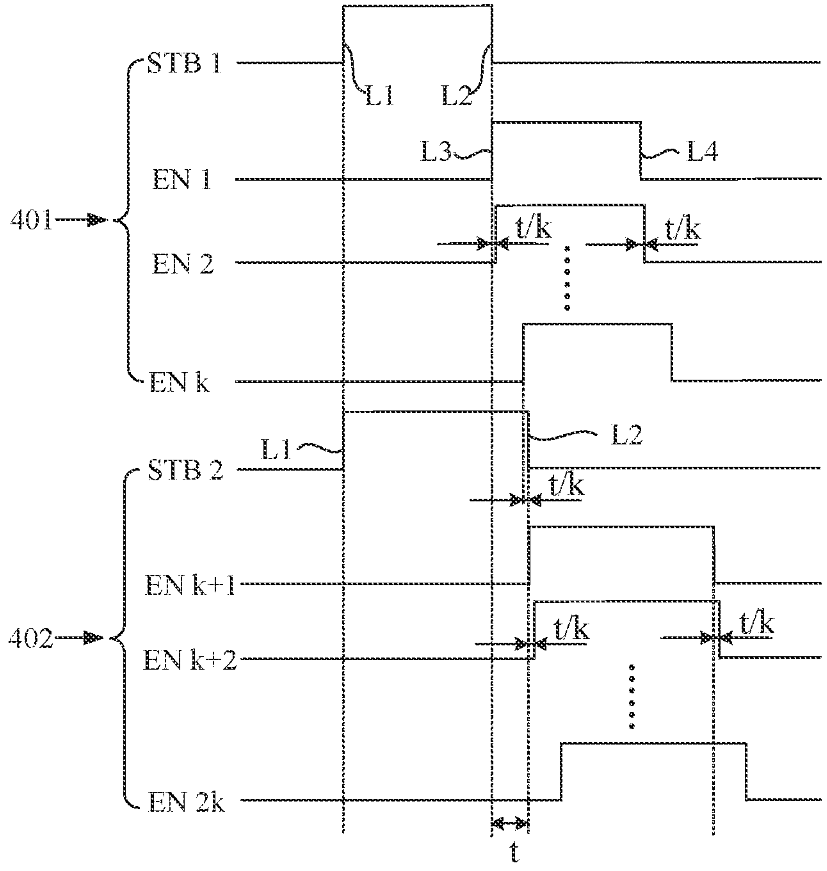
FIG. 19 is a waveform diagram of output enable signals, in accordance with some other embodiments.

The waveforms of the plurality of output enable signals may be set the same, and at least two output enable signals have a phase difference. On this premise, for example, referring to FIG. 18, each output channel of the first output buffer may output a first data voltage in response to a second triggering moment L4 of an output enable signal. In the direction in which the plurality of output channels are arranged, there is a time difference between moments at which any two adjacent output channels output data voltages. The first triggering moment L3 of at least one (e.g., one) output enable signal arrives at the same time as the first triggering moment L1 of the data transmission control signal, the first triggering moments L3 and the second triggering moments L4 of the output enable signals to which any two adjacent output channels respond are staggered, and a time difference between arrival moments of two first triggering moments L3 is equal to a time difference between arrival moments of two second triggering moments L4. In the second direction X, the moments at which the data lines in the first data line group receive the plurality of first data voltages are delayed step by step, and the delay time is t/k. For another example, referring to FIG. 19, each output channel of the first output buffer may output the first data voltage in response to the first triggering moment L3 of the output enable signal. In the direction in which the plurality of output channels are arranged, there is a time difference between moments at which any two adjacent output channels output the data voltages. The first triggering moment L3 of at least one (e.g., one) output enable signal arrives at the same time as the second triggering moment L2 of the data transmission control signal, the first triggering moments L3 and the second triggering moments L4 of the output enable signals to which any two adjacent output channels respond are staggered. In the second direction X, the moments at which the data lines in the first data line group receive the plurality of first data voltages are delayed step by step, and the delay time is t/k.

Figure 20:
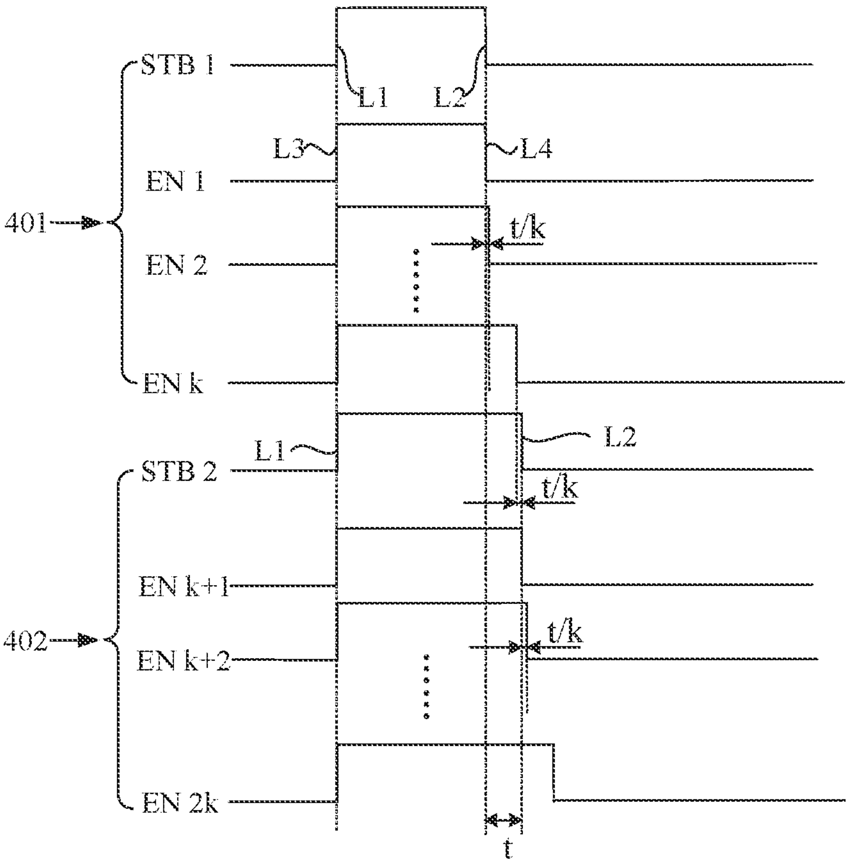
FIG. 20 is a waveform diagram of output enable signals, in accordance with yet other embodiments.

For example, the waveforms of at least two output enable signals may be set different, and there is a time difference between arrival moments of triggering moments of two signals output by any two output enable signals with different waveforms. For example, referring to FIG. 20, the waveforms of any two output enable signals output by the first delay controller are different, the first triggering moments L3 of the plurality of output enable signals arrive at the same time as the first triggering moment L1 of the first data transmission control signal STB1, and an arrival moment of the second triggering moment L4 of at least one output enable signal (e.g., output enable signals) is later than an arrival moment of the second triggering moment L2 of the first data transmission control signal STB1. In the second direction X, moments at which the data lines in the first data line group receive the plurality of first data voltages are delayed step by step, and the delay time is t/k.

Similar to the first source driver, the second source driver may also include at least one (e.g., one) delay controller (hereinafter referred to as a second delay controller). The arrangements of the second delay controller and a plurality of output enable signals output by the second delay controller are similar to the arrangements of the first delay controller and the plurality of output enable signals output by the first delay controller, and details will not be repeated herein.

Some embodiments of the present disclosure provide a display apparatus, the display apparatus includes the source driving circuit as described above, and the plurality of output enable signals are arranged as described above. In a case where the driving manner of the display apparatus is the single-side driving, in the direction in which the plurality of data lines DL are arranged, moments at which the plurality of data lines respectively receive the plurality of data voltages are delayed step by step from one side of the display apparatus to another side thereof. In a case where the driving manner of the display apparatus is double-side driving, the moments at which the plurality of data lines respectively receive the plurality of data voltages are symmetrically delayed step by step from two sides of the display apparatus to the middle thereof.

Some embodiments of the present disclosure provide a driving method for a source driver, which is used to drive the source driver in any of the above embodiments. The driving method for the source driver includes: the source driver receiving and latching image data, and outputting the image data in response to a first triggering moment of a data transmission control signal; the source driver converting the image data into a plurality of data voltages, and outputting the plurality of data voltages based on a second triggering moment of the data transmission control signal. There is a time difference between output moments of at least two data voltages.

Some embodiments of the present disclosure provide a driving method for a source driving circuit, which is used to drive the source driving circuit in any of the above embodiments. The driving method for the source driving circuit includes: a first source driver converting latched first image data into a plurality of first data voltages in response to a first triggering moment of a first data transmission control signal, and outputting the plurality of first data voltages based on a second triggering moment of the first data transmission control signal; a second source driver converting latched second image data into a plurality of second data voltages in response to a first triggering moment of a second data transmission control signal, and outputting the plurality of second data voltages based on a second triggering moment of the second data transmission control signal. There is a time difference between the second triggering moment of the first data transmission control signal and the second triggering moment of the second data transmission control signal.

Some embodiments of the present disclosure provide a computer-readable storage medium (e.g., a non-transitory computer-readable storage medium), the computer-readable storage medium stores therein computer program instructions that, when run on a computer (e.g., any of the display apparatuses as described above), cause the computer to execute the driving method for the source driver in any of the above embodiments or execute the driving method for the source driving circuit in any of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card and a flash memory device (e.g., an erasable programmable read-only memory (EPROM), a card, a stick or a key driver). Various computer-readable storage media described in the present disclosure may represent one or more devices and/or other machine-readable storage media, which are used for storing information. The term "machine-readable storage media" may include, but is not limited to, wireless channels and various other media capable of storing, containing and/or carrying instructions and/or data.

Some embodiments of the present disclosure further provide a computer program product. The computer program product includes computer program instructions that, when run on a computer (e.g., any of the display apparatuses as described above), cause the computer to execute the driving method for the source driver in any of the above embodiments or execute the driving method for the source driving circuit in any of the above embodiments.

Some embodiments of the present disclosure further provide a computer program. When the computer program is executed by the computer (e.g., any of the display apparatuses as described above), the computer program causes the computer to execute the driving method for the source driver in any of the above embodiments or the driving method for the source driving circuit in any of the above embodiments.

Beneficial effects of the computer-readable storage medium, the computer program product, and the computer program are the same as the beneficial effects of the driving method for the source driver or the driving method for the source driving circuit in some embodiments of the present disclosure, and details will not be repeated herein.

The foregoing descriptions are merely specific implementation manners of the present disclosure, but the protection scope of the present disclosure is not limited thereto, any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A source driving circuit, comprising:

a first source driver configured to convert latched first image data into a plurality of first data voltages in response to a first triggering moment of a first data transmission control signal, and output the plurality of first data voltages based on a second triggering moment of the first data transmission control signal; and a second source driver configured to convert latched second image data into a plurality of second data voltages in response to a first triggering moment of a second data transmission control signal, and output the plurality of second data voltages based on a second triggering moment of the second data transmission control signal, wherein the second triggering moment of the first data transmission control signal and the second triggering moment of the second data transmission control signal have a time difference therebetween;

the first source driver includes an output buffer, and the output buffer includes a plurality of output channels; the output buffer is configured to output the plurality of first data voltages respectively through the plurality of output channels based on the second triggering moment of the first data transmission control signal, output moments of at least two output channels have a time difference therebetween;

the first source driver further includes a delay controller, the delay controller is configured to output a plurality of output enable signals based on the first data transmission control signal; the output buffer is further configured to output the plurality of first data voltages respectively through the plurality of output channels in response to the plurality of output enable signals; wherein first triggering moments of the plurality of output enable signals arrive at a same time as the first triggering moment of the first data transmission control signal; and an arrival moment of a second triggering moment of at least one output enable signal is later than an arrival moment of the second triggering moment of the first data transmission control signal.

2. The source driving circuit according to claim 1, wherein the first triggering moment of the first data transmission control signal arrives at a same time as the first triggering moment of the second data transmission control signal; and/or a waveform of the first data transmission control signal is the same as a waveform of the second data transmission control signal, and the first data transmission control signal and the second data transmission control signal have a phase difference therebetween.

3. The source driving circuit according to claim 1, wherein in a direction in which the plurality of output channels are arranged, output moments of any two adjacent output channels have a same time difference therebetween.

4. A driving method for a source driving circuit used for driving the source driving circuit according to claim 1, the driving method comprising:

converting, by the first source driver, the latched first image data into the plurality of first data voltages in response to the first triggering moment of the first data transmission control signal;

outputting, by the first source driver, the plurality of first data voltages based on the second triggering moment of the first data transmission control signal;

converting, by the second source driver, the latched second image data into the plurality of second data voltages in response to the first triggering moment of the second data transmission control signal; and outputting, by the second source driver, the plurality of second data voltages based on the second triggering moment of the second data transmission control signal, wherein the second triggering moment of the first data transmission control signal and the second triggering moment of the second data transmission control signal have the time difference therebetween;

the driving method further comprising:

outputting, by the output buffer, the plurality of first data voltages respectively through the plurality of output channels based on the second triggering moment of the first data transmission control signal, wherein output moments of at least two output channels have a time difference therebetween;

the driving method further comprising:

outputting, by the delay controller, a plurality of output enable signals based on the first data transmission control signal; and outputting, by the output buffer, the plurality of first data voltages respectively through the plurality of output channels in response to the plurality of output enable signals; wherein first triggering moments of the plurality of output enable signals arrive at a same time as the first triggering moment of the first data transmission control signal; and an arrival moment of a second triggering moment of at least one output enable signal is later than an arrival moment of the second triggering moment of the first data transmission control signal.

5. A display apparatus, comprising:

the source driving circuit according to claim 1;

a plurality of gate lines;

a plurality of data lines; and at least one gate driver configured to generate a plurality of gate driving signals and output the plurality of gate driving signals respectively to the plurality of gate lines, wherein the source driving circuit is configured to output both the plurality of first data voltages and the plurality of second data voltages respectively to the plurality of data lines.

6. The display apparatus according to claim 5, further comprising:

a timing controller configured to provide the first data transmission control and the second data transmission control signal to the source driving circuit.

7. The display apparatus according to claim 5, wherein the plurality of gate lines have an equal line resistance.

8. The display apparatus according to claim 5, wherein in a direction in which the plurality of data lines are arranged, the at least one gate driver is located on a same side of the plurality of data lines, and moments at which the plurality of data lines respectively receive both the plurality of first data voltages and the plurality of second data voltages are delayed step by step.

9. The display apparatus according to claim 5, wherein the at least one gate driver includes a plurality of gate drivers; in a direction in which the plurality of data lines are arranged, the plurality of gate drivers include a first gate driver located on a side of the display apparatus, and a second gate driver located on another side of the display apparatus; and the first gate driver and the second gate driver are coupled to a same gate line;

in the direction in which the plurality of data lines are arranged, moments at which the plurality of data lines respectively receive both the plurality of first data voltages and the plurality of second data voltages are symmetrically delayed step by step from two sides of the display apparatus to a middle thereof.

10. A source driver, comprising:

a data buffer configured to receive and latch image data and output the image data in response to a first triggering moment of a data transmission control signal;

a digital-to-analog converter configured to receive the image data output by the data buffer and convert the image data into a plurality of data voltages; and an output buffer including a plurality of output channels, the output buffer being configured to output the plurality of data voltages respectively through the plurality of output channels based on a second triggering moment of the data transmission control signal, wherein output moments of at least two output channels have a time difference therebetween;

the source driver further comprises a delay controller, wherein the delay controller is configured to output a plurality of output enable signals based on the data transmission control signal; and the output buffer is configured to output the plurality of data voltages respectively through the plurality of output channels in response to the plurality of output enable signals; wherein first triggering moments of the plurality of output enable signals arrive at a same time as the first triggering moment of the data transmission control signal; and an arrival moment of a second triggering moment of at least one output enable signal is later than an arrival moment of the second triggering moment of the data transmission control signal.

11. The source driver according to claim 10, wherein in a direction in which the plurality of output channels are arranged, output moments of any two adjacent output channels have a same time difference.

12. A driving method for a source driver used for driving the source driver according to claim 10, the driving method comprising:

receiving and latching the image data, and outputting the image data in response to the first triggering moment of the data transmission control signal;

converting the image data into the plurality of data voltages; and outputting the plurality of data voltages based on the second triggering moment of the data transmission control signal, wherein output moments of at least two data voltages have a time difference therebetween;

the driving method further comprising:

outputting the plurality of output enable signals based on the data transmission control signal; and outputting the plurality of data voltages in response to the plurality of output enable signals; wherein first triggering moments of the plurality of output enable signals arrive at a same time as the first triggering moment of the data transmission control signal; and an arrival moment of a second triggering moment of at least one output enable signal is later than an arrival moment of the second triggering moment of the data transmission control signal.

13. A display apparatus, comprising:

a plurality of gate lines;

a plurality of data lines;

the source driver according to claim 9, the source driver being configured to output the plurality of data voltages respectively to the plurality of data lines; and at least one gate driver configured to generate a plurality of gate driving signals and output the plurality of gate driving signals respectively to the plurality of gate lines.

* * * * *